(12) United States Patent
Iwai et al.

(10) Patent No.: US 7,199,849 B2
(45) Date of Patent: Apr. 3, 2007

(54) PROJECTOR AND PHASE DIFFERENCE PLATE AND METHOD OF ARRANGING PHASE DIFFERENCE PLATE

(75) Inventors: Junichi Iwai, Kanagawa (JP); Hideki Yamamoto, Saitama (JP)

(73) Assignee: Sony Corporation, Tokyo (JP)

( * ) Notice: Subject to any disclaimer, the term of this patent is extended or adjusted under 35 U.S.C. 154(b) by 53 days.

(21) Appl. No.: 10/497,760

(22) PCT Filed: Oct. 6, 2003

(86) PCT No.: PCT/JP03/12779

§ 371 (c)(1),
(2), (4) Date: Jun. 4, 2004

(87) PCT Pub. No.: WO2004/031836

PCT Pub. Date: Apr. 15, 2004

(65) Prior Publication Data

US 2005/0007503 A1  Jan. 13, 2005

(30) Foreign Application Priority Data

Oct. 7, 2002 (JP) ............................. 2002-293897

(51) Int. Cl.
G02F 1/1335 (2006.01)
(52) U.S. Cl. ..................................... 349/119
(58) Field of Classification Search ................ 349/119
See application file for complete search history.

(56) References Cited

U.S. PATENT DOCUMENTS 5,311,340 A * 5/1994 Murata et al. .............. 349/119
5,337,174 A * 8/1994 Wada et al. ................. 349/119
5,440,413 A * 8/1995 Kikuchi et al. ............. 349/118

FOREIGN PATENT DOCUMENTS

| JP | 05-027118 | 2/1993 |
| JP | 06-230222 | 8/1994 |
| JP | 10-026756 | 1/1998 |
| JP | 2003-121645 | 4/2003 |
| JP | 2003-222724 | 8/2003 |

* cited by examiner

Primary Examiner—James Dudek
(74) Attorney, Agent, or Firm—Frommer Lawrence & Haug LLP; William S. Frommer; Thomas F. Presson

(57) ABSTRACT

Provided are a projector capable of correcting a polarization state properly and improving image quality, a retardation plate being used in a projector or the like and being capable of correcting a polarization state properly, and a method of placing a retardation plate. A quarter-wave plate (22) is placed between a reflective spatial light modulator (21) and a PBS (20). The quarter-wave plate (22) includes a combination of a first retardation plate (41) and a second retardation plate (42) each producing a different phase difference. The phase differences produced by two retardation plates (41), (42) are set to be suitable amounts of phase difference according to a position state, so in spite of the fact that the quarter-wave plate (22) including the combination of two retardation plates, the quarter-wave plate (22) can correct the polarization state properly with performance equal to or higher than that in the case where the quarter-wave plate includes a single plate.

3 Claims, 15 Drawing Sheets

| POSITION STATE | RELATIONSHIP BETWEEN SLOW AXIS OF QUARTER-WAVE PLATE AND REFERENCE DIRECTION | RELATIONSHIP BETWEEN SLOW AXIS OF RETARDATION PLATE ON SIDE CLOSER TO PBS AND REFERENCE DIRECTION | PREFERRED AMOUNT OF PHASE DIFFERENCE PRODUCED BY RETARDATION PLATE WITH SMALLER AMOUNT OF PHASE DIFFERENCE ($\lambda$) |
|---|---|---|---|
| Ss | ORTHOGONAL | ORTHOGONAL | $(0.75 \pm 0.3)$ or $(N - 0.25 \pm 0.2), N = 2-5$ |
| Sp | ORTHOGONAL | PARALLEL | $(0.5 \pm 0.4)$ or $(N - 0.5 \pm 0.3), N = 2-5$ |
| Ps | PARALLEL | ORTHOGONAL | $(N \pm 0.2), N = 1-3$ |
| Pp | PARALLEL | PARALLEL | LARGER THAN 0 AND 0.65 OR LESS or $(N - 0.75 \pm 0.4), N = 2-5$ |

FIG. 16

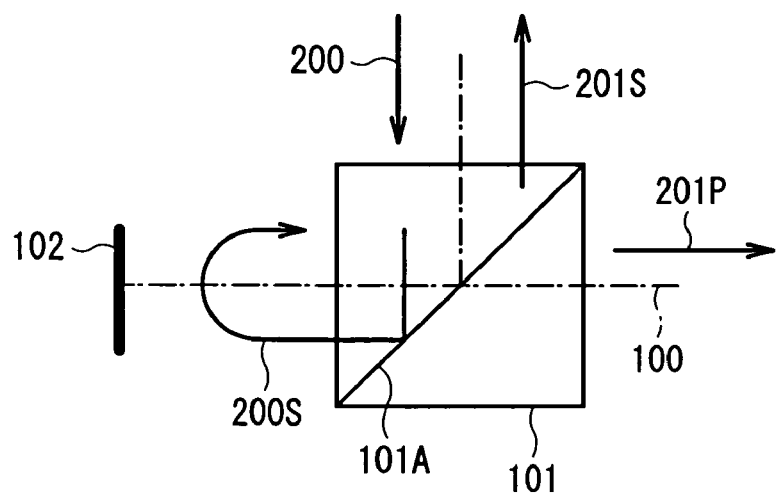

FIG. 17

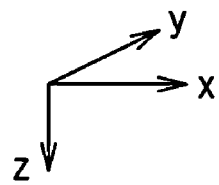
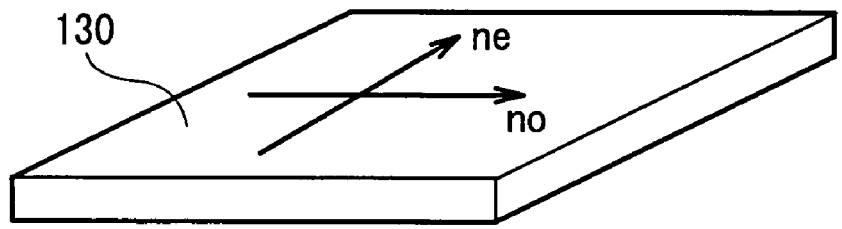
FIG. 21A
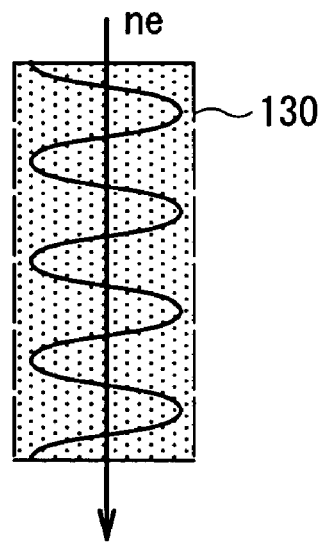
FIG. 21B
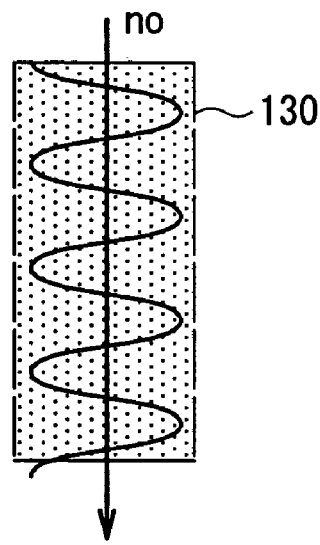
FIG. 21C

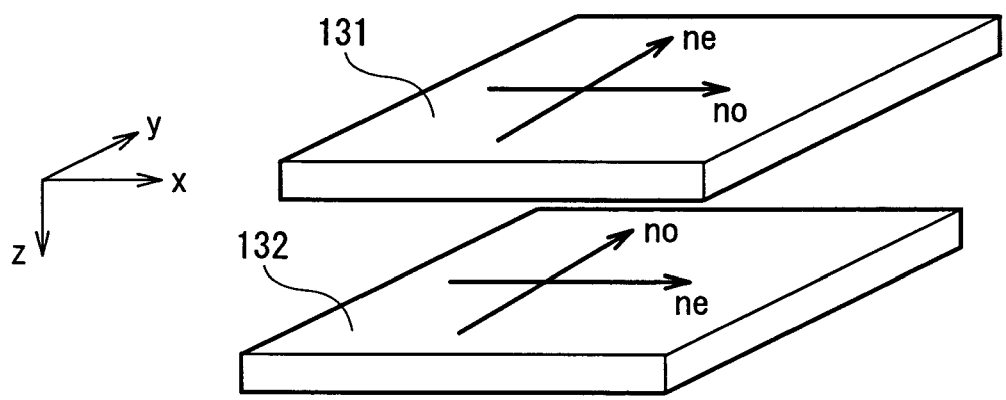
FIG. 22A
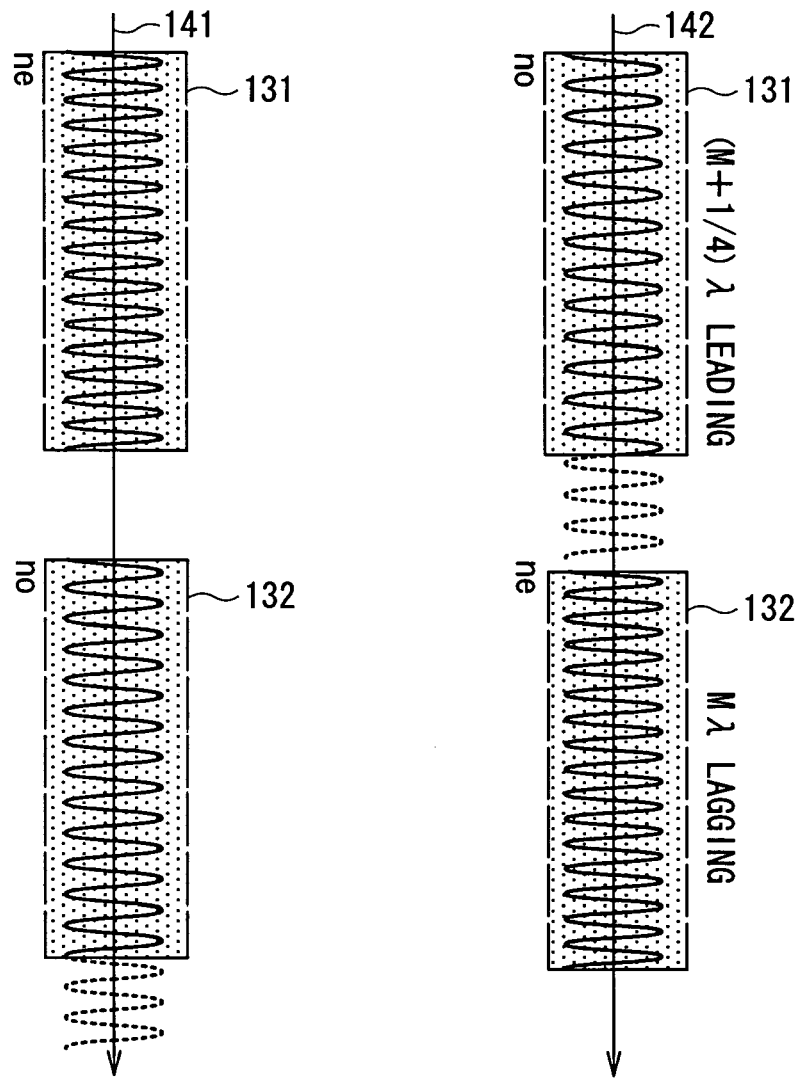
FIG. 22B
FIG. 22C

PROJECTOR AND PHASE DIFFERENCE PLATE AND METHOD OF ARRANGING PHASE DIFFERENCE PLATE

TECHNICAL FIELD

The present invention relates to a projector projecting light modulated by a spatial light modulator to produce an image, a retardation plate used in an illumination optical system or the like of the projector, and a method of placing a retardation plate.

BACKGROUND ART

A projection display apparatus (projector) which produces an image through modulating light from a light source by a spatial light modulator to project the modulated light on a screen through a projection lens is conventionally known. As the spatial light modulator, for example, a liquid crystal display (LCD) panel, a digital micromirror device (DMD) or the like is used. Types of the spatial light modulator include a transmissive one which transmits modulated incident light, and a reflective one which reflects modulated incident light.

A projector using the reflective spatial light modulator forms an image using a phenomenon in which among polarized components selected (transmitted or reflected) by a polarization selecting device such as a PBS (polarizing beam splitter) at the time of the entry of light, a component of which the polarization state is changed by the spatial light modulator is reversely selected (reflected or transmitted) by the polarization selecting device so as to be traveled in a direction different from the light source.

A part controlling light modulation in the reflective projector will be described in detail below referring to FIG. 17. In FIG. 17, a numeral 100 represents an optical axis. As shown in the drawing, only S-polarized component light 200S in incident light 200 from the light source is selected (reflected) on a polarization selecting surface 101A of a PBS 101 to reach a reflective liquid crystal display panel 102 as a spatial light modulator. In a state that the reflective liquid crystal display panel 102 has no influence on the polarization state of the reached light (off state), the reached light which remains S-polarized is reflected on the reflective liquid crystal display panel 102 to return to the PBS 101, and the S-polarized light as S-polarized component light 201S is reflected on the polarization selecting surface 101A of the PBS 101 in a direction opposite to a direction where light enters to return to the light source side.

On the other hand, in a state that the reflective liquid crystal display panel 102 has an influence on the polarization state (on state), a part or all of reflected light from the reflective liquid crystal display panel 102 is converted into P-polarized component light 201P to pass through the polarization selecting surface 101A of the PBS 101. The passed P-polarized component light 201P forms an image on the screen through a projection lens (not shown). Gray scale is controlled by the amount of change in the polarization state in the reflective liquid crystal display panel 102.

Alternatively, contrary to the state shown in FIG. 17, the incident light from the light source enters from a front side of the reflective liquid crystal display panel 102, and a light beam selected by reflection on the polarization selecting surface 101A of the PBS 101 in light returned from the reflective liquid crystal display panel 102 can be guided to the projection lens.

In such a reflective projector, in the off state, all light beams which are S-polarized component light 200S when the light beams enter the reflective liquid crystal display panel 102 must be returned to the light source side as the S-polarized component light 201S after the reflection (when the light beams emit). However, in reality, some of the light beams are converted into P-polarized component light 201P to pass through the PBS 101.

The reason will be described referring to FIGS. 18 and 19 below. FIGS. 18 and 19 show an optical positional relationship of the polarization selecting surface 101A of the PBS 101 at the time of the enter of light and at the time of the emission of light.

An electric field direction of each of P-polarized light and S-polarized light is determined by a traveling direction of a light beam and a direction of a normal n1 in a plane of incidence (polarization selecting surface 101A). Therefore, as shown in FIG. 18, when the polarization selecting surface 101A before the entry of light is parallel to that after the entry of light, that is, the direction of the normal is the same before and after the entry of light, the directions of the P-polarized light and the S-polarized light before the entry of light and after the emission of light coincide with each other. In such an ideal state, light 200S reflected on the PBS 101 as the S-polarized component on an incident side becomes S-polarized component light 201S on an emission side.

However, in an optical system in a practical projector as shown in FIG. 17, the above-described ideal positional relationship between the light beam and the PBS 101 is not established. In a practical optical system, a light beam is reflected on the reflective liquid crystal display panel 102, so as shown in FIG. 19, a relationship of the polarization selecting surface 101A at the time of the entry and at the time of the emission is a symmetric (mirror) relationship with respect to a plane including the reflective liquid crystal display panel 102. Therefore, the direction of the normal of the polarization selecting surface 101A at the time of the entry is different from that at the time of emission, thereby the electric field directions of the P-polarized light and the S-polarized light are not the same, and the light 200S reflected as the S-polarized component at the time of the entry includes the P-polarized component light 201P on the polarization selecting surface 101A at the time of the emission even in the off state that the reflective liquid crystal display panel 102 has no influence on the polarization state. The P-polarized component is not removed at the time of the emission and reaches an image area which is supposed to be black, thereby image quality (mainly a extinction ratio) is impaired.

As described above, there is a problem that in the case where two or more surfaces where light enters exist, unless the surfaces are parallel to each other, a general light beam includes a different polarized component on each surface, so a component which is supposed to be removed at the time of the emission remains, thereby image quality is impaired.

A typical solution to the problem is to place a ¼-wavelength retardation plate (quarter-wave plate) between the reflective liquid crystal display panel 102 and the PBS 101 to correct the polarization state. In this case, the light beam passes back and forth through the quarter-wave plate twice, so the quarter-wave plate effectively functions as a half-wave plate.

FIG. 20 shows an optical positional relationship of each optical device at the time of the entry of light and at the time of the emission of light in the case where the quarter-wave plate is placed. In FIG. 20, when an axis of a quarter-wave plate 121 is set to be vertical to a paper surface, a light beam pass back and forth through the quarter-wave plate 121 twice, thereby the electric field direction of the light beam symmetrically reversed on a surface including an optical axis 100 in the drawing and being vertical to the paper surface. As a result, the electric field direction of the light 200S reflected on the polarization selecting surface 101A (represented by a solid line) on the incident side as a S-polarized component coincides with the electric field direction of a light beam reflected on a virtual polarization selecting surface 101B (represented by a dotted line) as S-polarized light. The direction coincides with the S-polarized component on the PBS 101 on the emission side, so the direction is well removed in the PBS 101 on the emission side, thereby degradation of the extinction ratio (=incident light/emission light) can be prevented. For example, a conventional technique using such a quarter-wave plate is proposed in Japanese Unexamined Patent Application Publication No. Hei 10-26756.

A correction technique using the quarter-wave plate effectively works, when an ideal retardation plate which produces a phase difference of ¼ wavelength for any light beam is used. However, in reality, the amount of phase difference varies depending upon an incident angle, so when a light beam with a large angle with respect to an optical axis is included, degradation of the extinction ratio occurs. There is a tendency that the larger the incident angle is, or the thicker the retardation plate is, the more the extinction ratio is reduced.

Referring to FIGS. 21A through 21C and 22A through 22C, a commonly used retardation plate will be described below. When light enters a crystal with optical anisotropy such as quartz crystal, a refractive index is different depending upon an electric field direction, so a difference in wavelength occurs, thereby a phase difference corresponding to a difference in wave number occurs. In a retardation plate 130 shown in FIG. 21A, an ordinary ray (a light beam having a refractive index no) is higher in speed than an extraordinary ray (a light beam having a refractive index ne), thereby when the wavelength increases, a phase difference occurs. FIGS. 21B and 21C schematically show a state of the extraordinary ray and a state of the ordinary ray in the retardation plate 130, respectively.

The retardation plate introduces a phase difference between orthogonal components of incident light, and in the retardation plate, between two vibration components orthogonal to each other, a vibration direction of a vibration component with a higher phase speed is called "fast axis" and a vibration direction of a vibration component with a lower phase speed is called "slow axis". In FIGS. 21A through 21C, a direction of the refractive index no of the ordinary ray (x-direction) is a fast axis, and a direction of the refractive index ne of the extraordinary ray (y-direction) is a slow axis.

In the quartz crystal, an optical path length (thickness) required to produce a phase difference of ¼ wavelength between the ordinary ray and the extraordinary ray is approximately 15 microns. It is difficult to actually form a retardation plate of quartz crystal with this thickness, because the thickness is too thin, so as shown in FIG. 22A, in general, a first retardation plate 131 and a second retardation plate 132 which each produce a different phase difference are combined so that the total phase difference produced by a combination of the retardation plates 131 and 132 is adjusted to be ¼ wavelength. In this case, the retardation plates 131 and 132 are placed so that a positional relationship between the axis of the refractive index no (fast axis) and the axis of the refractive index ne (slow axis) are 90° different from each other.

FIGS. 22B and 22C schematically show a state that incident light beams 141 and 142 of which the vibration directions are orthogonal to each other pass through the retardation plates 131 and 132. The light beam 141 is a component of which the vibration direction is oriented in a y-direction in FIG. 22A, and the light beam 142 is a component of which the vibration direction is oriented in an x-direction in FIG. 22A. The incident light beam 142 is converted into an ordinary ray on the first retardation plate 131 so that the phase of the light beam 142 is $(M+¼)\lambda$ leading, and then the light beam 142 is converted into an extraordinary ray on the second retardation plate 132 so that the phase of the light beam 142 is $M\lambda$ lagging, thereby the light beam 142 has the total phase difference of ¼ wavelength with respect to the incident light beam 141. Incidentally, $\lambda$ represents one wavelength. Conventionally, when a phase difference produced by each of the retardation plates 131 and 132 is determined, mainly only manufacturability (thickness) is considered. Therefore, as long as the retardation plates can produce a phase difference of ¼ wavelength in total, specific structures of the retardation plates present no problem. For example, in the case where retardation plates are made of quartz crystal, two retardation plates have a total thickness of 600 microns or over in general.

Thus, in the case where two retardation plates are combined, as a result, when an eventual incident angle is small (close to vertical incidence), the retardation plates function properly; however, fluctuations in phase difference with respect to a diagonally incident light beam increase, thereby degradation of the extinction ratio occurs. When an incident angle is limited within a small range in order to prevent the degradation, another problem that a decline in the amount of available light results in a darker image area arises.

As another material of the retardation plate, there is an organic film having optical anisotropy by drawing or the like. In the case of the organic film, compared to quartz crystal, a difference between the refractive index no of the ordinary ray and the refractive index ne of the extraordinary ray is smaller, so depending upon materials, the organic film with a thickness of approximately 60 microns can produce a phase difference of ¼ wavelength. When the organic film can have such a thickness, two organic films are not required, and the retardation plate can be formed with only one organic film, thereby a thin retardation plate can be achieved. The degradation of the extinction ratio is caused by the thickness of the retardation plate and a difference between the refractive index of the ordinary ray and the refractive index of the extraordinary ray, so the performance of the organic film with a thickness of approximately 60 microns is as good as that of quartz crystal with a thickness of approximately 15 microns. Although the organic film has been already used in projectors and the like as a quarter-wave plate, the organic film is vulnerable to a temperature rise, so a problem of long-term reliability arises.

In summary, when an ideal quarter-wave plate is placed between the reflective liquid crystal display panel 102 and the PBS 101, the polarization state can be corrected properly. However, in a practical quarter-wave plate, a phase difference for a light beam diagonally passing therethrough varies depending upon conditions of the entry, so the polarization state is not sufficiently corrected, thereby the following problems of image quality arise in the projector.

1) As light of a component of which the polarization state cannot be corrected enters an image area, an area which is supposed to be dark is not sufficiently dark.

2) When diagonally incident light is limited in order to avoid the above problem, the amount of available light is reduced, thereby the whole image area becomes dark.

A typically used organic material film is formed so as to have a minimum thickness required to produce a phase difference of approximately ¼ wavelength, thereby the above decline in image quality is avoided as much as possible; however, the organic material is vulnerable to a temperature rise, thereby a problem of long-term reliability arises. On the other hand, quartz crystal which is a more typical material of the wave plate is resistant to a temperature rise, and has superior long-term reliability; however, there is a problem that it is difficult to form the wave plate with a minimum thickness required to produce a phase difference of approximately ¼ wavelength. A typical quartz crystal wave plate includes a combination of two wave plates, thereby the quartz crystal wave plate produces a phase difference of approximately ¼ wavelength, so compared to the organic material film, an effective thickness of the quartz crystal wave plate increases, thereby the quartz crystal wave plate has the above two problems that a decline in image quality becomes pronounced.

In view of the foregoing, it is a first object of the invention to provide a projector capable of properly correcting a polarization state to improve image quality. Moreover, it is a second object of the invention to provide a retardation plate being used in a projector or the like and being capable of properly correct a polarization state and a method of placing a retardation plate.

DISCLOSURE OF THE INVENTION

A projector according to each of a first aspect, a second aspect, a third aspect and a fourth aspect of the invention comprises: a reflective spatial light modulator performing modulation by control of a polarization state; a polarization selecting device having a polarization selecting surface inclined with respect to the spatial light modulator, selecting light of a predetermined polarized component in incident light in the polarization selecting surface to enter the selected light into the spatial light modulator, and emitting light of a polarized component different from the predetermined polarized component in light modulated and reflected by the spatial light modulator in a direction different from a direction where the incident light enters; a quarter-wave plate being placed between the spatial light modulator and the polarization selecting device; and a projecting means projecting light reflected by the spatial light modulator and selected by the polarization selecting device to form an image, wherein the quarter-wave plate includes a first retardation plate and a second retardation plate each producing a different amount of phase difference, and the first and the second retardation plates are placed and combined in order from a side closer to the polarization selecting device so that their slow axes are orthogonal to each other, thereby a combination of the first and the second retardation plates produces a phase difference of approximately ¼ wavelength.

Specifically, in the projector according to the first aspect of the invention, assuming that a direction of the line of intersection of a surface including a normal of the polarization selecting surface and a normal of the quarter-wave plate and a plate surface of the quarter-wave plate is a reference direction, the first retardation plate placed on a side closer to the polarization selecting device is placed so that the slow axis thereof is substantially orthogonal to the reference direction, and a slow axis of the quarter-wave plate is placed so as to be substantially orthogonal to the reference direction, an amount of phase difference produced by a retardation plate producing a smaller absolute value of the amount of phase difference between the first and the second retardation plates is within a range of (0.75±0.3) wavelength, or within a range of (N−0.25±0.2) wavelength where N is an integer ranging from 2 to 5 inclusive.

In the projector according to the second aspect of the invention, assuming that a direction of the line of intersection of a surface including a normal of the polarization selecting surface and a normal of the quarter-wave plate and a plate surface of the quarter-wave plate is a reference direction, the first retardation plate placed on a side closer to the polarization selecting device is placed so that the slow axis thereof is substantially parallel to the reference direction, and a slow axis of the quarter-wave plate is placed so as to be substantially orthogonal to the reference direction, an amount of phase difference produced by a retardation plate producing a smaller absolute value of the amount of phase difference between the first and the second retardation plates is within a range of (0.5±0.4) wavelength, or within a range of (N−0.5±0.3) wavelength where N is an integer ranging from 2 to 5 inclusive.

In the projector according to the third aspect of the invention, assuming that a direction of the line of intersection of a surface including a normal of the polarization selecting surface and a normal of the quarter-wave plate and a plate surface of the quarter-wave plate is a reference direction, the first retardation plate placed on a side closer to the polarization selecting device is placed so that the slow axis thereof is substantially orthogonal to the reference direction, and a slow axis of the quarter-wave plate is placed so as to be substantially parallel to the reference direction, an amount of phase difference produced by a retardation plate producing a smaller absolute value of the amount of phase difference between the first and the second retardation plates is within a range of (N±0.2) wavelength where N is an integer ranging from 1 to 3 inclusive.

In the projector according to the fourth aspect of the invention, assuming that a direction of the line of intersection of a surface including a normal of the polarization selecting surface and a normal of the quarter-wave plate and a plate surface of the quarter-wave plate is a reference direction, the first retardation plate placed on a side closer to the polarization selecting device is placed so that the slow axis thereof is substantially parallel to the reference direction, and a slow axis of the quarter-wave plate is placed so as to be substantially parallel to the reference direction, an amount of phase difference produced by a retardation plate producing a smaller absolute value of the amount of phase difference between the first and the second retardation plates is within a range of larger than 0 and 0.65 wavelength or less, or within a range of (N−0.75±0.4) wavelength where N is an integer ranging from 2 to 5 inclusive.

A method of placing a retardation plate according to each of a first aspect, a second aspect, a third aspect and a fourth aspect of the invention comprising the step of: placing a quarter-wave plate producing a phase difference of approximately ¼ wavelength between a spatial light modulator and a polarization selecting device, the spatial light modulator performing modulation by control of a polarization state, and the polarization selecting device having a polarization selecting surface inclined with respect to the spatial light modulator, selecting light of a predetermined polarized component in incident light in the polarization selecting surface to enter the selected light into the spatial light modulator, and emitting light of a polarized component different from the predetermined polarized component in light modulated and reflected by the spatial light modulator in a direction different from a direction where the incident light enters, wherein the quarter-wave plate includes a first retardation plate and a second retardation plate each producing a different amount of phase difference, and the first and the second retardation plates are placed and combined in order from a side closer to the polarization selecting device so that their slow axes are orthogonal to each other, thereby a combination of the first and the second retardation plates produces a phase difference of approximately ¼ wavelength.

In the method of placing a retardation plate according to the first aspect of the invention, assuming that a direction of the line of intersection of a surface including a normal of the polarization selecting surface and a normal of the quarter-wave plate and a plate surface of the quarter-wave plate is a reference direction, the first retardation plate placed on a side closer to the polarization selecting device is placed so that the slow axis thereof is substantially orthogonal to the reference direction, and a slow axis of the quarter-wave plate is placed so as to be substantially orthogonal to the reference direction, an amount of phase difference produced by a retardation plate producing a smaller absolute value of the amount of phase difference between the first and the second retardation plates is within a range of (0.75±0.3) wavelength, or within a range of (N−0.25±0.2) wavelength where N is an integer ranging from 2 to 5 inclusive.

In the method of placing a retardation plate according to the second aspect of the invention, assuming that a direction of the line of intersection of a surface including a normal of the polarization selecting surface and a normal of the quarter-wave plate and a plate surface of the quarter-wave plate is a reference direction, the first retardation plate placed on a side closer to the polarization selecting device is placed so that the slow axis thereof is substantially parallel to the reference direction, and a slow axis of the quarter-wave plate is placed so as to be substantially orthogonal to the reference direction, an amount of phase difference produced by a retardation plate producing a smaller absolute value of the amount of phase difference between the first and the second retardation plates is within a range of (0.5±0.4) wavelength, or within a range of (N−0.5±0.3) wavelength where N is an integer ranging from 2 to 5 inclusive.

In the method of placing a retardation plate according to the third aspect of the invention, assuming that a direction of the line of intersection of a surface including a normal of the polarization selecting surface and a normal of the quarter-wave plate and a plate surface of the quarter-wave plate is a reference direction, the first retardation plate placed on a side closer to the polarization selecting device is placed so that the slow axis thereof is substantially orthogonal to the reference direction, and a slow axis of the quarter-wave plate is placed so as to be substantially parallel to the reference direction, an amount of phase difference produced by a retardation plate producing a smaller absolute value of the amount of phase difference between the first and the second retardation plates is within a range of (N±0.2) wavelength where N is an integer ranging from 1 to 3 inclusive.

In the method of placing a retardation plate according to the fourth aspect of the invention, assuming that a direction of the line of intersection of a surface including a normal of the polarization selecting surface and a normal of the quarter-wave plate and a plate surface of the quarter-wave plate is a reference direction, the first retardation plate placed on a side closer to the polarization selecting device is placed so that the slow axis thereof is substantially parallel to the reference direction, and a slow axis of the quarter-wave plate is placed so as to be substantially parallel to the reference direction, an amount of phase difference produced by a retardation plate producing a smaller absolute value of the amount of a phase difference between the first and the second retardation plates is within a range of larger than 0 and 0.65 wavelength or less, or within a range of (N−0.75±0.4) wavelength where N is an integer ranging from 2 to 5 inclusive.

A retardation plate according to the invention is placed on a incident side of a reflective spatial light modulator performing modulation of incident light by control of a polarization state, and includes a first retardation plate and a second retardation plate each producing a different amount of phase difference, the first and the second retardation plates being placed and combined so that their slow axes are substantially orthogonal to each other, thereby a combination of the first and the second retardation plates produces a phase difference of approximately ¼ wavelength, wherein an amount of phase difference produced by a retardation plate producing a smaller absolute value of the amount of a phase difference between the first and the second retardation plates is within a range of larger than 0 and ¾ wavelength or less, or within a range of 1 wavelength to 3/2 wavelength inclusive.

In the projector, the method of placing a retardation plate, and the retardation plate according to each aspect of the invention, the first and the second retardation plates may include a single plate or a plurality of plates.

In the projector and the method of retardation plate according to each of the first through the fourth aspects of the invention, the quarter-wave plate placed between the reflective spatial light modulator and the polarization selecting device corrects the polarization state of a light beam traveling between the reflective spatial light modulator and the polarization selecting device. The quarter-wave plate includes a combination of the first and the second retardation plates each producing a different phase difference, and phase differences produced by two retardation plates are set to be suitable amounts of phase difference according to the position state, thereby in spite of the fact that the quarter-wave plate includes the combination of two retardation plate, the quarter-wave plate can correct the polarization state properly with performance equal to or higher than that in the case where the quarter-wave plate includes a single plate.

In the retardation plate according to the invention, in the case where the retardation plate is used in, for example, a projector, and is placed between the reflective spatial light modulator and the polarization selecting device, a great improvement in correction of the polarization state can be easily obtained.

BRIEF DESCRIPTION OF THE DRAWINGS

FIG. 16 is a table showing characteristics of each position state and a preferred amount of phase difference in each position state;

FIG. 17 is an illustration showing a schematic structure of a part controlling light modulation in a reflective projector;

FIGS. 21A through 21C are illustrations showing structures of a typical retardation plate; and FIGS. 22A through 22C are illustrations showing a retardation plate including two plates.

BEST MODE FOR CARRYING OUT THE INVENTION

Preferred embodiments of the present invention are described in more detail below referring to the accompanying drawings.

Figure 1:
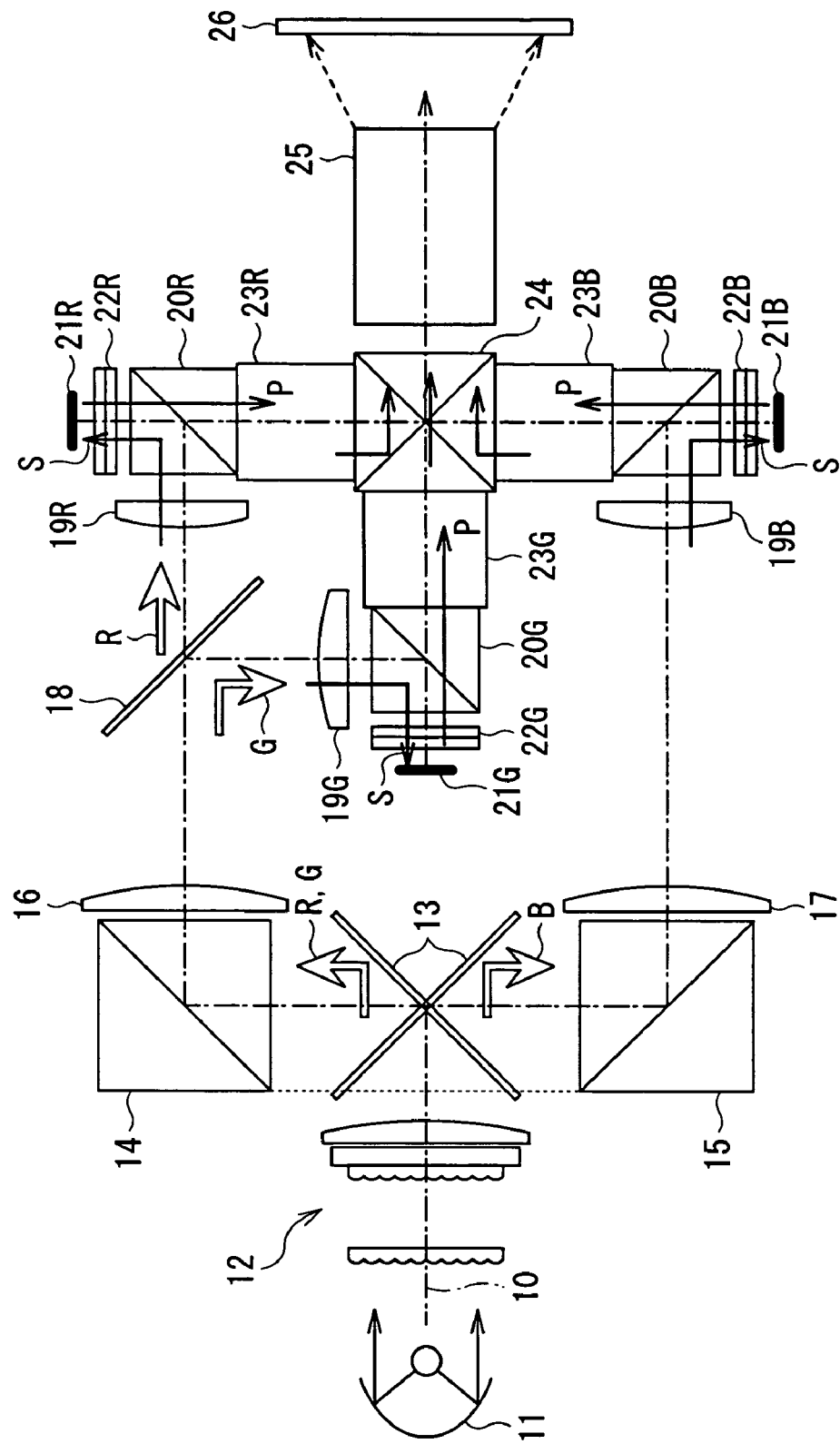
FIG. 1 is an illustration showing an example of the structure of a projector according to an embodiment of the invention.

FIG. 1 shows an example of the structure of a projector according to an embodiment of the invention. The projector is a so-called three-panel reflective projector which displays a color image by using three reflective spatial light modulators 21R, 21G and 21B for red, green and blue, respectively.

The projector comprises a light source 11, an integrator 12 and a dichroic mirror 13 along an optical axis 10. The light source 11 emits white light including red light (R), blue light (B) and green light (G) which are required to display a color image, and the light source 11 includes, for example, a halogen lamp, a metal halide lamp a xenon lamp or the like. The integrator 12 includes a PS converter or the like, and the integrator 12 is disposed to homogenize and efficiently use light from the light source 11. The dichroic mirror 13 has a function of dividing light into blue light B and light of other colors R and G.

The projector further comprises a pre-PBS (polarizing beam splitter) 14, a converging lens 16 and a dichroic mirror 18 on an optical path of the light of red R and green G divided by the dichroic mirror 13 in order in which light travels. The projector further comprises a pre-PBS 15 and a converging lens 17 on an optical path of the blue light B divided by the dichroic mirror 13 in order in which light travels. The pre-PBSs 14 and 15 each have a function of selectively reflecting light of a predetermined polarized component in incident light. The dichroic mirror 18 has a function of dividing the light of other colors entered through the pre-PBS 14 and the converging lens 16 into the red light R and the green light G.

In the projector, on optical paths of the red light R, the green light G and the blue light B, converging lenses 19R, 19G and 19B, PBSs 20R, 20G and 20B, and quarter-wave plates 22R, 22G and 22B, and spatial light modulators 21R, 21G and 21B are disposed in order from a light incident side, respectively. The PBSs 20R, 20G and 20B correspond to specific examples of "a polarization selecting device" in the invention.

The spatial light modulators 21R, 21G and 21B each include reflective liquid crystal panels or the like. Each color light of a predetermined polarized component (for example, S-polarized component) selected by a polarization selecting surface of each of the PBSs 20R, 20G and 20B enters each of the spatial light modulators 21R, 21G and 21B. The spatial light modulators 21R, 21G and 21B each modulate the incident light by controlling the polarization state of the light to reflect the modulated light toward the PBSs 20R, 20G and 20B.

The PBSs 20R, 20G and 20B each have a polarization selecting surface inclined with respect to the spatial light modulators 21R, 21G and 21B, respectively, and the PBSs 20R, 20G and 20B each have functions of selecting (reflecting) light of a predetermined polarized component (S-polarized component) in the incident light by the polarization selecting surface to enter the selected light into the spatial light modulators 21R, 21G and 21B, and selecting (transmitting) light of a polarized component (P-polarized component) different from the above predetermined polarized component in the light modulated and reflected by the spatial light modulators 21R, 21G and 21B to emit the selected light. The example of FIG. 1 shows an optical position that S-polarized component light is reflected by the PBSs 20R, 20G and 20B to become incident light to the spatial light modulators 21R, 21G and 21B, and P-polarized component light in light returned from the spatial light modulators 21R, 21G and 21B passes through the PBSs 20R, 20G and 20B as emission light. However, on the other hand, a position that P-polarized incident light is entered from the front side of the spatial light modulators 21R, 21G and 21B, and S-polarized component light selected by reflection by the spatial light modulators 21R, 21G and 21B in the returned light becomes light for image display can be used.

The quarter-wave plates 22R, 22G and 22B correct the polarization state between the PBSs 20R, 20G and 20B, and the spatial light modulators 21R, 21G and 21B, respectively, and produce a phase difference of approximately ¼ wavelength between polarized components orthogonal to each other. The quarter-wave plates 22R, 22G and 22B are portions having a most characteristic structure in the embodiment, and will be described in detail later.

The projector further comprises a cross dichroic prism 24, a projection lens 25 and a screen 26. The cross dichroic prism 24 has a function of combining color light of predetermined polarized components selected by the PBSs 20R, 20G and 20B to emit the combined light. The cross dichroic prism 24 has three entrance surfaces and one emission surface. Spacers 23R, 23G and 23B are disposed between the light entrance surfaces in the cross dichroic prism 24 and light emission surfaces in the PBSs 20R, 20G and 20B, respectively, so as to prevent a stress strain due to a change in temperature of the optical devices or the like.

The projection lens 25 is disposed on the emission surface side of the cross dichroic prism 24. The projection lens 25 has a function of projecting the combined light emitted from the cross dichroic prism 24 toward the screen 26. The projection lens 25 corresponds to a specific example of "a projecting means" in the invention.

Figure 2:
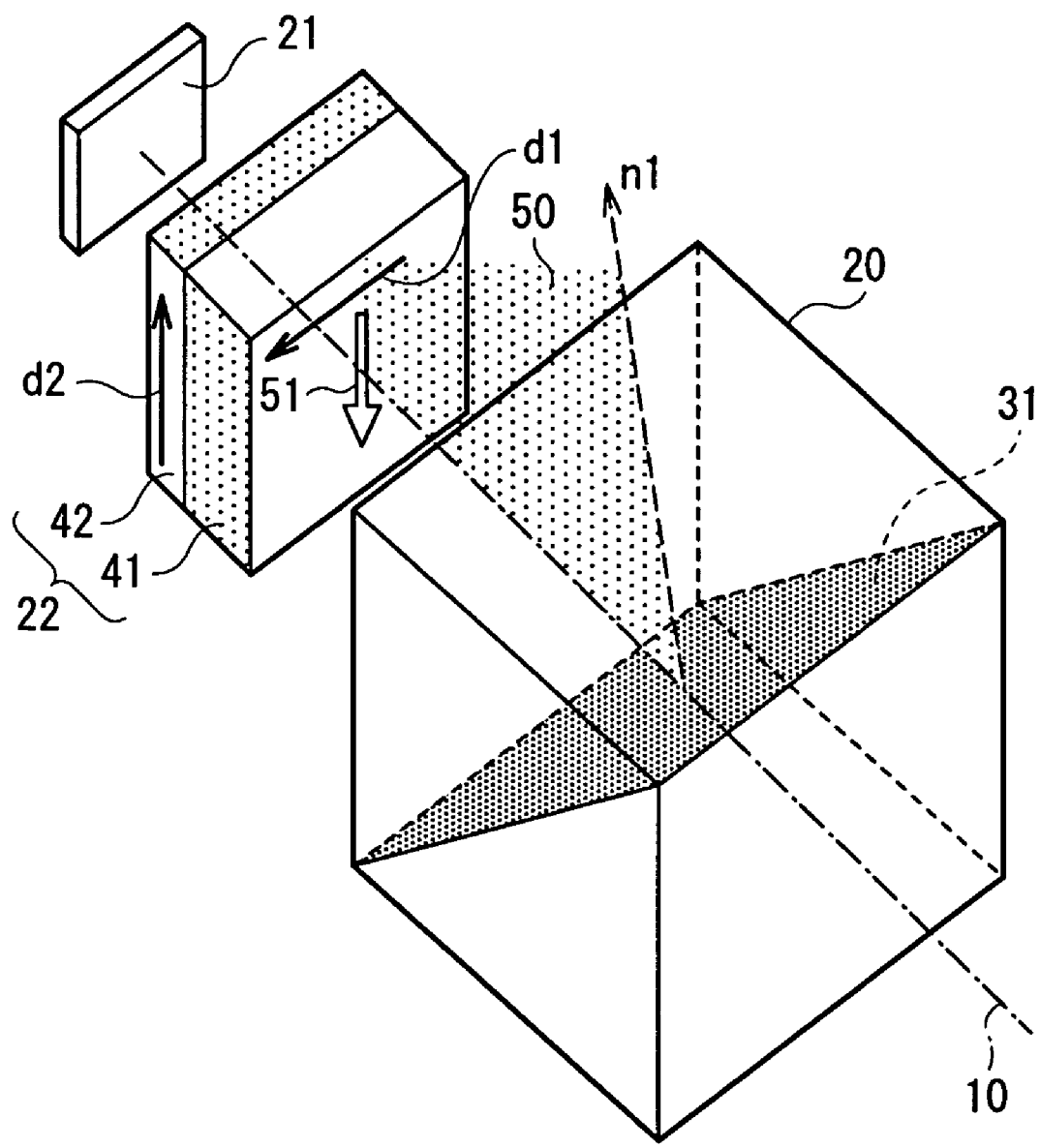
FIG. 2 is an illustration showing a structure of a quarter-wave plate together with an optical positional relationship of the quarter-wave plate with a PBS and a spatial light modulator.

FIG. 2 shows a structure of the quarter-wave plate 22 (22R, 22G and 22B) together with an optical positional relationship of the quarter-wave plate 22 with the PBS 20 (20R, 20G and 20B) and the spatial light modulator 21 (21R, 21G and 21B). The structures of the optical devices for the colors are practically the same, so they will be described with no distinction between the colors unless otherwise specifically required.

The quarter-wave plate 22 includes a first retardation plate 41 and a second retardation plate 42 which each produce a different amount of phase difference. The first and the second retardation plates 41 and 42 are disposed and combined in order from a side closer to the PBS 20 so that slow axes d1 and d2 thereof are substantially orthogonal to each other, thereby the combination of the first and the second retardation plates 41 and 42 produces a phase difference of approximately ¼ wavelength. The first and the second retardation plates 41 and 42 are made of crystal having optical anisotropy such as quartz crystal or an organic film having optical anisotropy by drawing or the like. The first and the second retardation plates 41 and 42 may include a single plate or a plurality of plates.

Thus, when the quarter-wave plate 22 includes the combination of two retardation plates 41 and 42, and is placed between the PBS 20 and the spatial light modulator 21, there are four ways to use (position states) as described below.

Herein, as shown in FIG. 2, a direction of the line of intersection of a surface 50 including a normal n1 of the polarization selecting surface 31 in the PBS 20 and a normal of the quarter-wave plate 22 and a plate surface of the quarter-wave plate 22 is defined as a reference direction 51. The reference direction 51 coincides with a P-polarized direction with respect to a light beam parallel to the optical axis 10 in general.

When the reference direction 51 is defined in such a manner, two cases that the direction of a slow axis of the combination of the first and the second retardation plates 41 and 42 is substantially parallel to the reference direction 51 and substantially orthogonal to the reference direction 51 are considered. Moreover, two cases where a slow axis d1 of the first retardation plate 41 disposed on a side closer to the PBS 20 is substantially parallel to the reference direction 51 and substantially orthogonal to the reference direction 51 are considered. They can be separately selected, so there are four combinations of the first and the second retardation plates 41 and 42 in total.

These combinations are the same regardless of whether the first and the second retardation plates 41 and 42 are made of uniaxial crystal such as quartz crystal or an organic film, so no distinction between crystal and the organic film is required. FIG. 2 shows the case where the slow axis of the quarter-wave plate 22 and the slow axis d1 of the first retardation plate 41 are substantially orthogonal to the reference direction 51, assuming that the first and the second retardation plates 41 and 42 are made of the same material.

Figure 3:
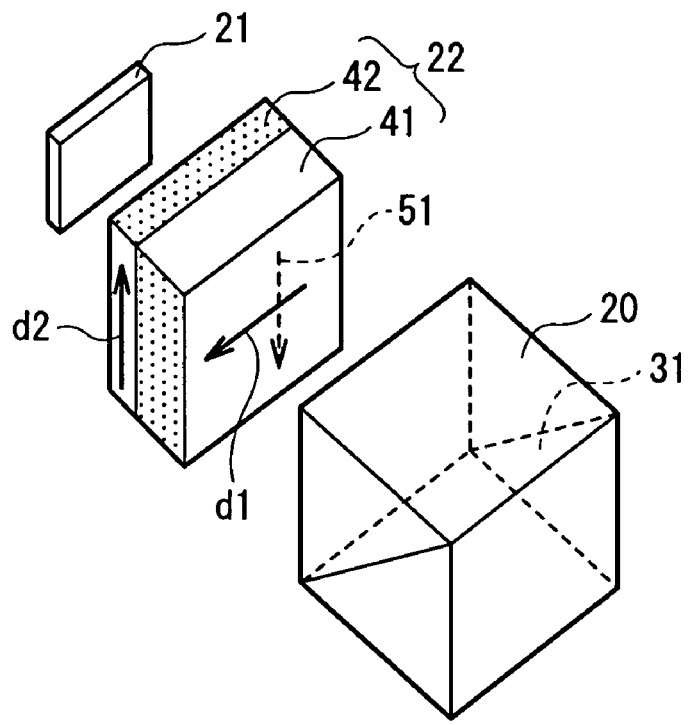
FIG. 3 is an illustration showing a first position state of the quarter-wave plate.

FIGS. 3 through 6 show four combinations of the first and the second retardation plates 41 and 42. At first, FIG. 3 shows the case where the slow axis of the quarter-wave plate 22 is substantially orthogonal to the reference direction 51, and the slow axis d1 of the first retardation plate 41 is substantially orthogonal to the reference direction 51. Hereinafter, a first position state shown in FIG. 3 is referred to as "a state Ss". It means that assuming that the reference direction 51 corresponds to a P-polarized direction, and a direction orthogonal to the reference direction 51 corresponds to a S-polarized direction, with symbols P and S, the former letter (S in Ss) represents the direction of the slow axis, and the latter letter (s in Ss) represents the direction of the slow axis d1 of the first retardation plate 41. The notation is the same in the following other combinations.

Figure 4:
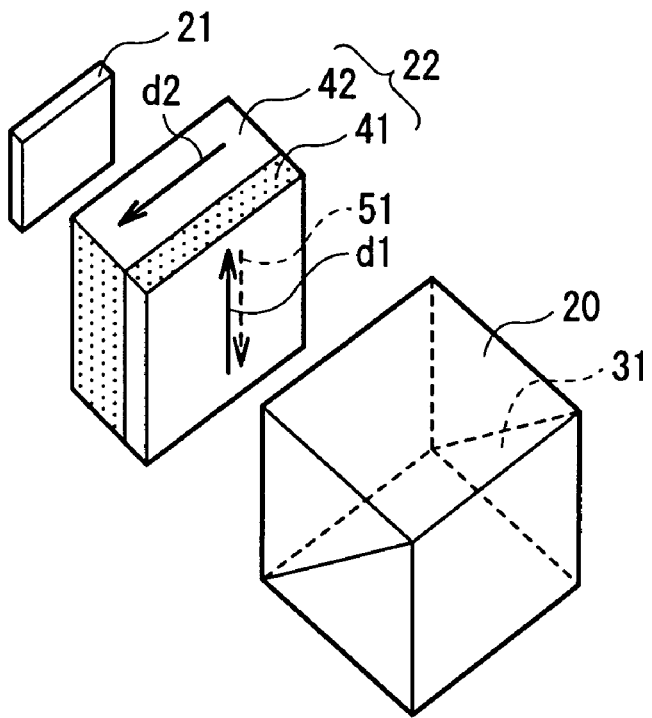
FIG. 4 is an illustration showing a second position state of the quarter-wave plate.

FIG. 4 shows the case where the slow axis of the quarter-wave plate 22 is substantially orthogonal to the reference direction 51, and the slow axis d1 of the first retardation plate 41 is substantially parallel to the reference direction 51. Hereinafter, a second position state is referred to as "a state Sp".

Figure 5:
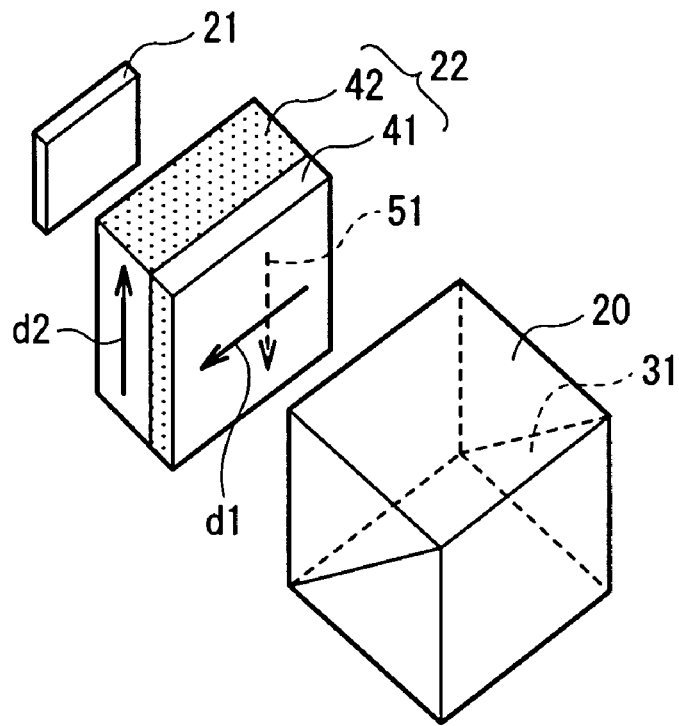
FIG. 5 is an illustration showing a third position state of the quarter-wave plate.

FIG. 5 shows the case where the slow axis of the quarter-wave plate 22 is substantially parallel to the reference direction 51 and the slow axis d1 of the first retardation plate is substantially orthogonal to the reference direction 51. Hereinafter, a third position state is referred to as "a state Ps".

Figure 6:
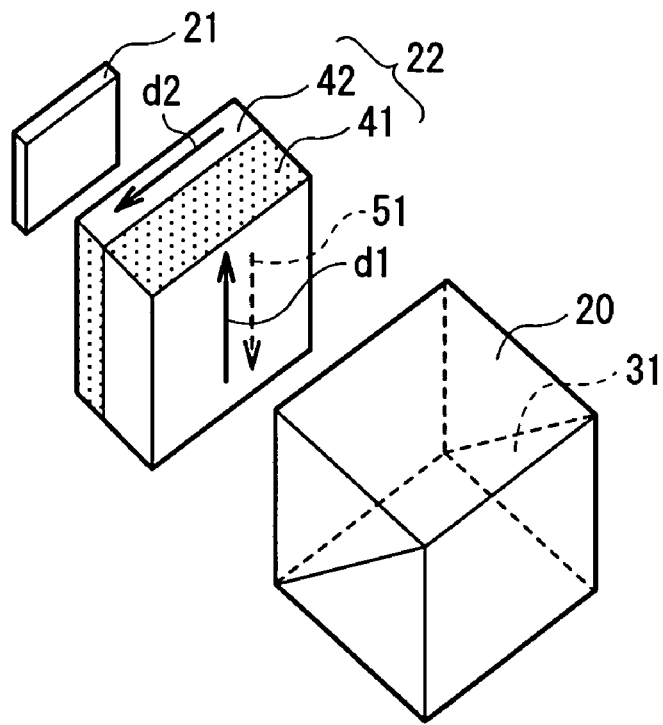
FIG. 6 is an illustration showing a fourth position state of the quarter-wave plate.

FIG. 6 shows the case where the slow axis of the quarter-wave plate 22 is substantially parallel to the reference direction 51 and the slow axis d1 of the first retardation plate is substantially parallel to the reference direction 51. Hereinafter, a fourth state is referred to as "a state Pp".

When the quarter-wave plate 22 is designed, the amount of phase difference produced by each of the retardation plates 41 and 42 must be set. Conventionally, as long as they produce a phase difference of approximately ¼ wavelength in total, the amount of phase difference produced by each of the retardation plates 41 and 42 presents no problem. However, in reality, as described later, it is found out that a difference between the phase differences produced by the retardation plates 41 and 42 causes a difference in an extinction ratio in the projector. Moreover, it is found out that conditions for obtaining a favorable extinction ratio vary depending upon the position states of FIGS. 3 through 6. In the embodiment, in each of the states of FIGS. 3 through 6, the phase differences produced by the retardation plates 41 and 42 are set to be appropriate values so that the polarization state can be properly corrected to improve image quality of the projector. Specific phase differences which the retardation plates 41 and 42 should produce will be described later.

Next, actions of the projector with such a structure will be described below.

In the projector, white light emitted from the light source 11 enters the dichroic mirror 13 through the integrator 12.

The dichroic mirror 13 divides the incident white light into blue light B and light of other colors R and G. The blue light B enters the PBS 20B through the pre-PBS 15, the converging lens 17 and the converging lens 19B. The light of other colors R and G enters the dichroic mirror 18 through the pre-PBS 14 and the converging lens 16, and are divided into the red light R and the green light G by the dichroic mirror 18. The red light R and the green light G enter the PBSs 20R and 20G through the converging lenses 19R and 19G, respectively.

Only S-polarized component light in the light entered into the PBSs 20R, 20G and 20B is selected (reflected) by the polarization selecting surface thereof, and the S-polarized component light reaches the spatial light modulators 21R, 21G and 21B through the quarter-wave plates 22R, 22G and 22B, respectively. In the state where the spatial light modulators 21R, 21G and 21B have no influence on the polarization state (off state), the reached light which remains S-polarized is reflected by the spatial light modulators 21R, 21G and 21B to return to the PBSs 20R, 20G and 20B through the quarter-wave plates 22R, 22G and 22B, respectively, and the light as the S-polarized component light is reflected by the polarization selecting surface in a direction opposite to a direction where the light enters to return to the light source side.

On the other hand, in the state where the spatial light modulators 21R, 21G and 21B have an influence on the polarization state (on state), a part or all of the reflected light from the spatial light modulators 21R, 21G and 21B is converted into P-polarized component light to return to the PBSs 20R, 20G and 20B through the quarter-wave plates 22R, 22G and 22B, respectively, and then the P-polarized component light passes through the polarization selecting surface.

In the embodiment, as will be described later, the structures and optical position states of the quarter-wave plates 22R, 22G and 22B are appropriately set to correct the polarization state between the spatial light modulators 21R, 21G and 21B and the PBSs 20R, 20G and 20B, respectively, so compared to a conventional projector, degradation of the extinction ratio can be prevented, and image quality can be improved.

The P-polarized component light of the colors having passed through the PBSs 20R, 20G and 20B is combined in the cross dichroic prism 24 to be emitted toward the projection lens 25. The projection lens 25 projects the combined light toward the screen 26. Thereby, an image is formed on the screen 26. Gray scale is controlled depending upon an amount of change in the polarization state in the spatial light modulators 21R, 21G and 21B.

Next, the amount of phase difference which each of the retardation plates 41 and 42 of the quarter-wave plate 22 (22R, 22G and 22B) should produce will be described below.

Figure 7:
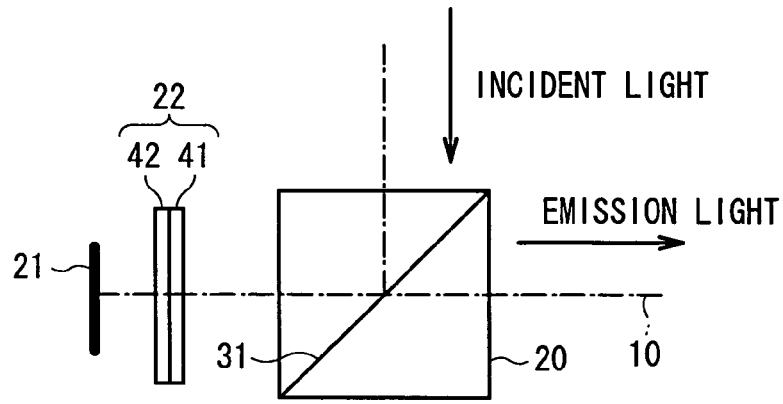
FIG. 7 is an illustration showing an optical system model used in a performance simulation of the quarter-wave plate.
Figure 8:
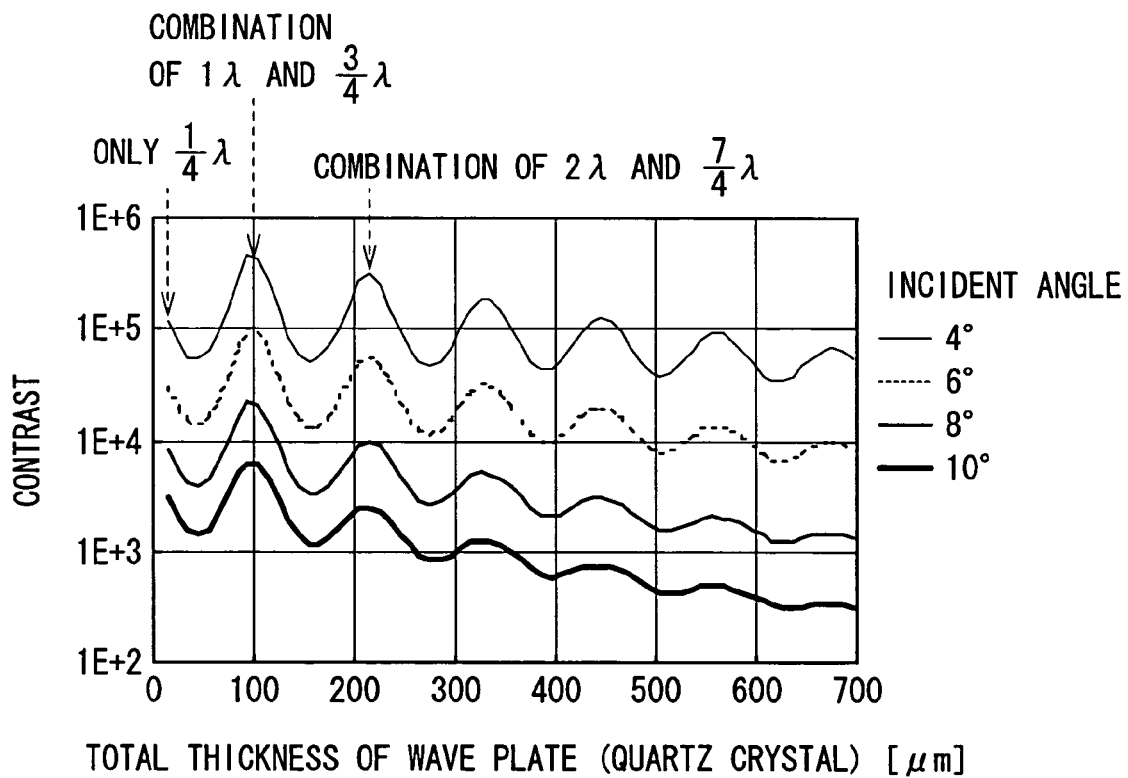
FIG. 8 is a graph showing results of a simulation in the case where the quarter-wave plate is made of quartz crystal in the first position state.

FIG. 8 shows results of a simulation under conditions of the following computing model in the case where the spatial light modulator 21 is in the off state. In the simulation, an optical system shown in FIG. 7 including an ideal PBS with a transmittance for the S-polarized component of 0% and a transmittance for the P-polarized component of 100% as the PBS 20, a total reflection mirror as the spatial light modulator 21 and a quartz crystal retardation plate as the quarter-wave plate 22 is used as a model for calculation. It is assumed that incident light is non-polarized light, and wavelength of the incident light is equal to the designed wavelength of the quarter-wave plate 22. Further, it is assumed that the quarter-wave plate 22 is in the first position state Ss shown in FIG. 3.

In a graph of FIG. 8, the horizontal axis represents the total thickness of the first and the second retardation plates 41 and 42 in a state that they are combined to form the quarter-wave plate, and the vertical axis represents contrast (extinction ratio (=incident light/emission light)). In FIG. 8, the extinction ratios of light beams with incident angles of 4°, 6°, 8° and 10° with respect to the optical axis are plotted in the graph. A left end of each curve corresponds to the case where the quarter-wave plate 22 includes a single plate. The thickness of the quarter-wave plate 22 in this case is approximately 15 microns.

As can be seen from the graph of FIG. 8, in each light beam with a different incident angle, there is a general tendency that the more the thickness of the wave plate increases, the more the extinction ratio declines; however, a periodic structure also exists, so a peak value is periodically shown in the extinction ratio. As a result, there is a thickness with which a better extinction ratio than the case where the quarter-wave plate 22 includes a single plate (refer to the left end of the graph) can be obtained. The first peak is shown at the thickness of a combination of a retardation plate producing a phase difference of 1 wavelength ($\lambda$) and a retardation plate producing a phase difference of $\frac{3}{4}$ wavelength, and the next peak is shown at the thickness of a combination of a retardation plate producing a phase differences of 2 wavelength and a retardation plate producing a phase difference of $\frac{7}{4}$ wavelength. In other words, in the case where the first retardation plate 41 on a side closer to the PBS 20 is a 1-wave plate, and the second retardation plate 42 on a side closer to the spatial light modulator 21 is a $\frac{3}{4}$-wave plate, the highest peak value is shown, and the next highest peak value is shown in the case where the first retardation plate 41 is a 2-wave plate, and the second retardation plate 42 is a $\frac{7}{4}$-wave plate.

The quarter-wave plate 22 can obtain performance equal to or higher than that in the case where the quarter-wave plate 22 includes the single plate until the thickness of a combination of a retardation plate producing a phase difference of 5 wavelength and a retardation plate producing $\frac{19}{4}$ ($=5-\frac{1}{4}$) wavelength in the case of the light beam with an incident angle of 4° with respect to the optical axis, and until the thickness of a combination of a retardation plate producing a phase difference of 2 wavelength and a retardation plate producing a phase difference of $\frac{7}{4}$ ($=2 \cdot \frac{1}{4}$) wavelength in the case of the light beam with an incident angle 8°. The performance in the case where the quarter-wave plate 22 includes a single plate is the same irrespective of whether the single plate is made of quartz crystal or an organic film, so as long as the retardation plates are combined so as to have such a peak value, a quarter-wave plate including a combination of quartz crystal retardation plates with performance equal to or higher than a currently used retardation plate made of an organic film can be formed.

Figure 9:
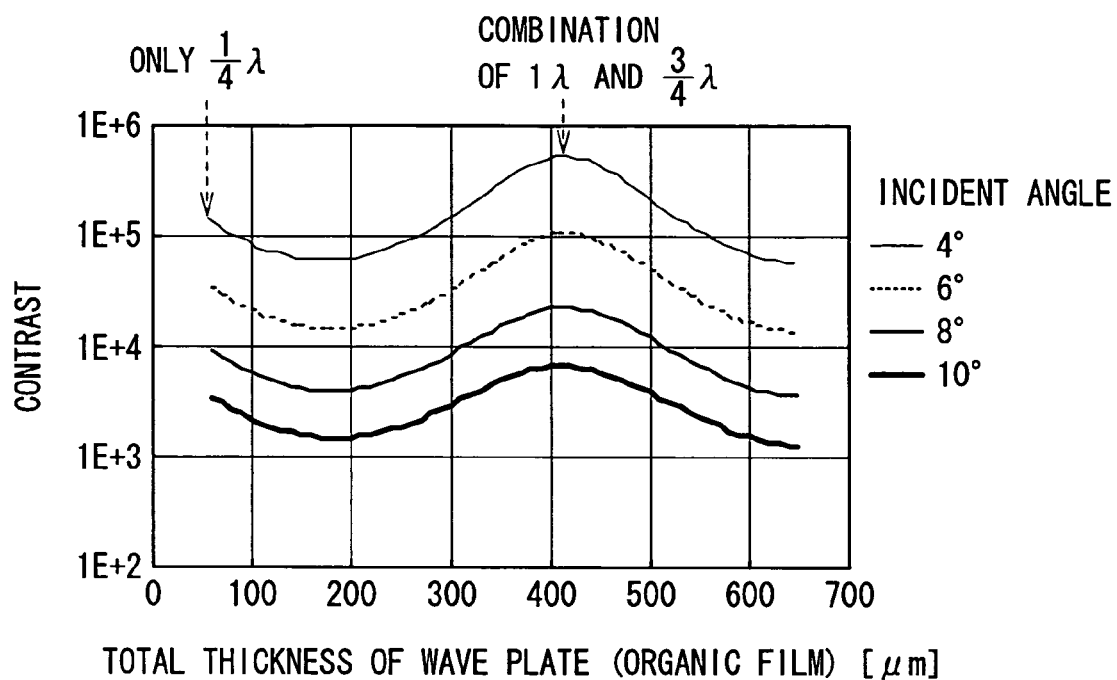
FIG. 9 is a graph showing results of a simulation in the case where the quarter-wave plate is made of an organic film in the first position state.

A graph of FIG. 9 shows results of a simulation in the case where an organic film is used as the quarter-wave plate 22. The calculation conditions are the same as in the case of FIG. 8 where the quartz crystal retardation plate is used as a model. FIG. 9 is a graph in the case where the wavelength of a light beam is the same as the designed wavelength of the quarter-wave plate 22, and FIG. 10 shows results of a simulation in the case where the wavelength of a light beam is 24 nm longer than the designed wavelength.

As can be seen from FIG. 9, in the case of the organic film, an improvement in performance can be achieved in some combinations of phase differences. Moreover, as can be seen from FIG. 10, it is shown that even in the case where an average value declines due to a wavelength different from the designed wavelength, the thickness at which the performance is maximized is not changed. The latter case is a practically important fact, because it is shown that even if a preferred combination of phase differences is determined by the designed wavelength, the quarter-wave plate has an effect of improving performance for a light beam with a wavelength different from the designed wavelength.

Figure 10:
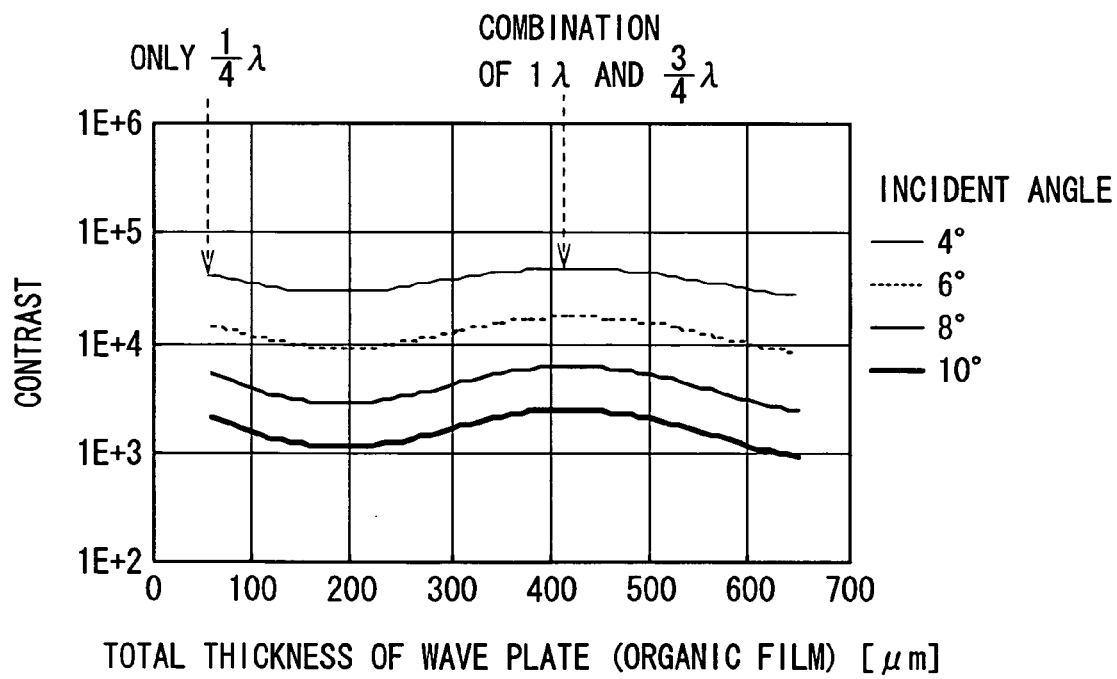
FIG. 10 is a graph showing results of a simulation in the case where the quarter-wave plate is made of an organic film in the first position state and the wavelength of a light beam is longer than a designed wavelength.
Figure 11A:
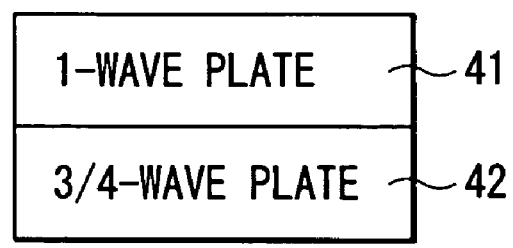
FIGS. 11A through 11E are illustrations showing preferred combinations of a first retardation plate and a second retardation plate in the first position state.
Figure 11B:
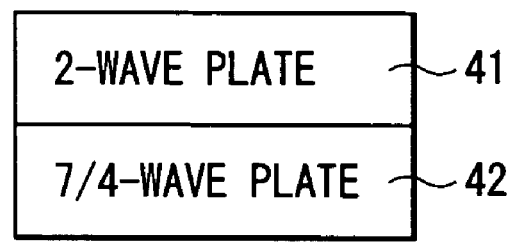
Figure 11C:
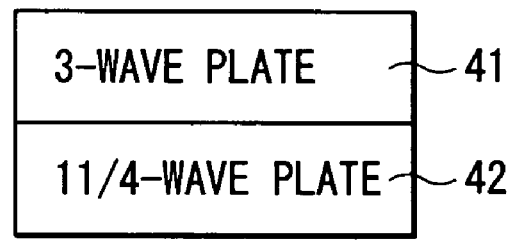
Figure 11D:
Figure 11E:
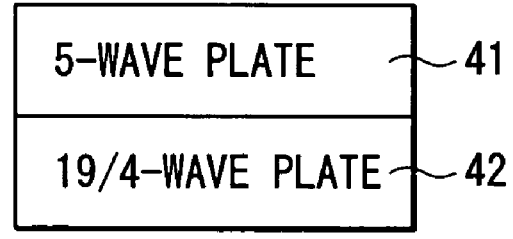
Figure 12:
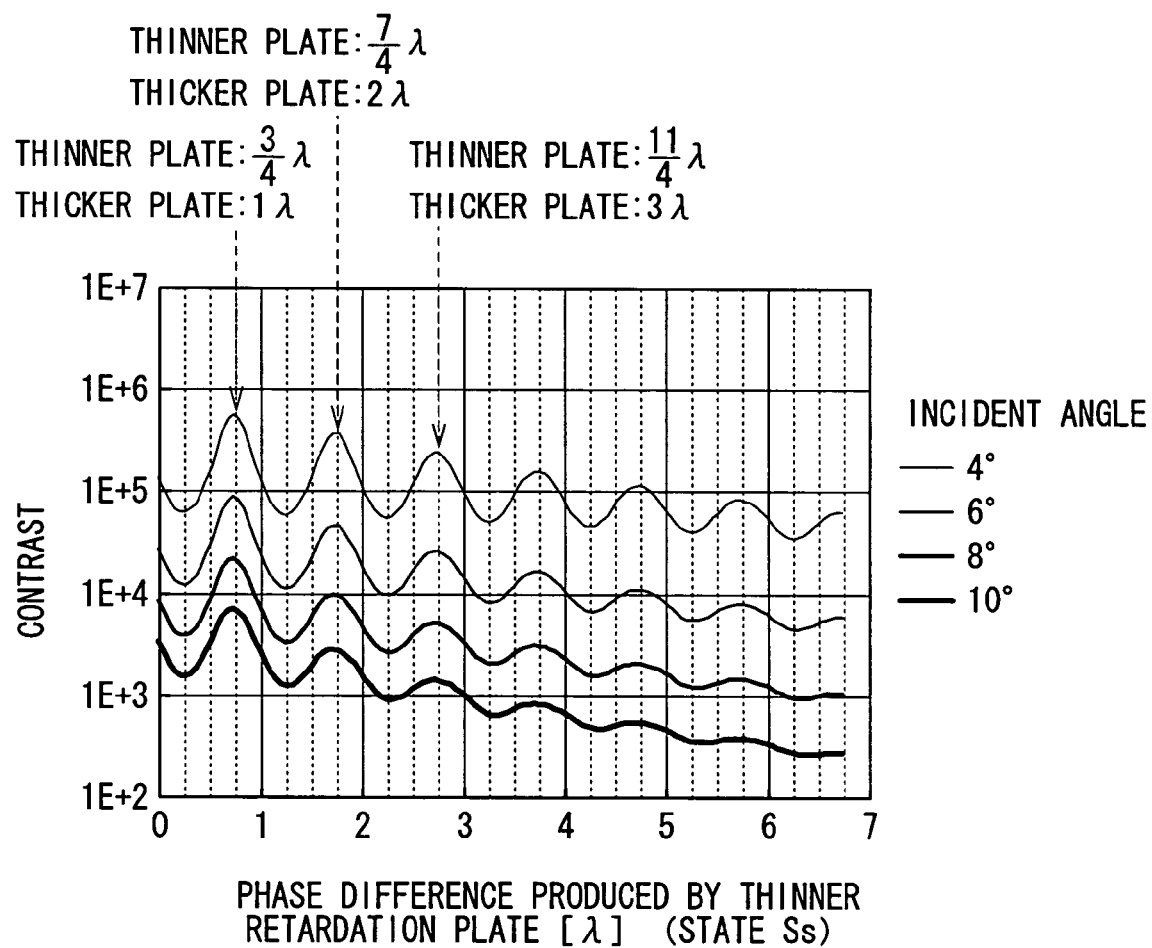
FIG. 12 is a graph showing results of a simulation in the first position state wherein the horizontal axis represents an amount of phase difference produced by a thinner retardation plate.

In the graphs of FIGS. 8 through 10, the horizontal axis represents the actual thickness of the quarter-wave plate 22; however, in order to eliminate a difference in appearance by a difference in material, FIG. 12 shows a graph showing a thickness required to produce a certain phase difference as a reference. In the graph, the horizontal axis represents an amount of phase difference produced by a thinner retardation plate (producing a smaller absolute value of the amount of phase difference) between two retardation plates 41 and 42 constituting the quarter-wave plate 22. The graphs show results of a simulation in the case of the state Ss, so the horizontal axis represents an amount of phase difference produced by the second retardation plate 42 on a side closer to the spatial light modulator 21. The quarter-wave plate 22 has a phase difference of ¼ wavelength, so when the phase difference produced by the thinner retardation plate is determined, the phase difference produced by the thicker retardation plate (producing a larger absolute value of the amount of phase difference) is uniquely determined.

FIGS. 11A through 11E show preferred combinations of the first and the second retardation plates 41 and 42 on the basis of the above results. A retardation plate producing a phase difference of 1 wavelength is abbreviated to a 1-wave plate. Other films are abbreviated in the same manner. In reality, the combination of the retardation plates 41 and 42 is not required to be exactly the same as the combinations shown in FIGS. 11A through 11E, and even if phase differences produced by the retardation plate 41 and 42 are slightly different from those in each combination shown in FIGS. 11A through 11E, the combination has sufficient performance. As can be seen from the graph of FIG. 12, the first peak value is shown when the phase difference produced by the thinner retardation plate is ¾ (=0.75) wavelength, and the peak value is higher than other peak values, so a margin of approximately ±0.3 wavelength for the phase difference can be allowed. Moreover, in the case where the phase difference produced by the thinner retardation plate is ⁷⁄₄ wavelength, ¹¹⁄₄ wavelength, ¹⁵⁄₄ wavelength and ¹⁹⁄₄ wavelength, a margin of approximately ±0.2 wavelength for the phase difference can be allowed. In summary, when a phase difference produced by the thinner retardation plate is within a range of (0.75±0.3) wavelength, or within a range of (N−0.25±0.2) wavelength assuming that N is an integer ranging from 2 to 5 inclusive, performance equal to or higher than that in the case where the quarter-wave plate 22 includes a single plate (in the case where the phase difference produced by the thinner retardation plate is 0 in FIG. 12) can be obtained.

Figure 13:
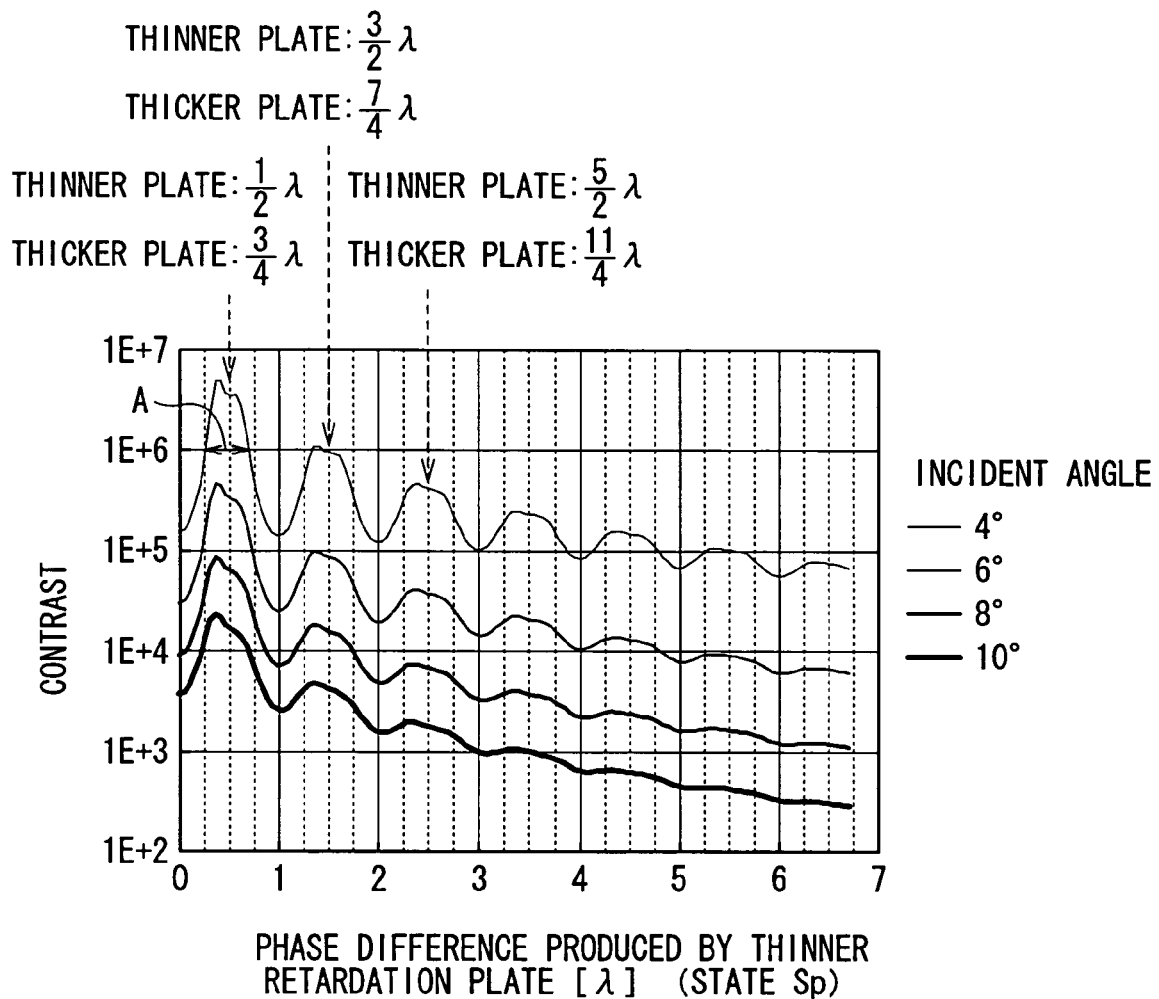
FIG. 13 is a graph showing results of a simulation in the second position state wherein the horizontal axis represents an amount of phase difference produced by a thinner retardation plate.
Figure 14:
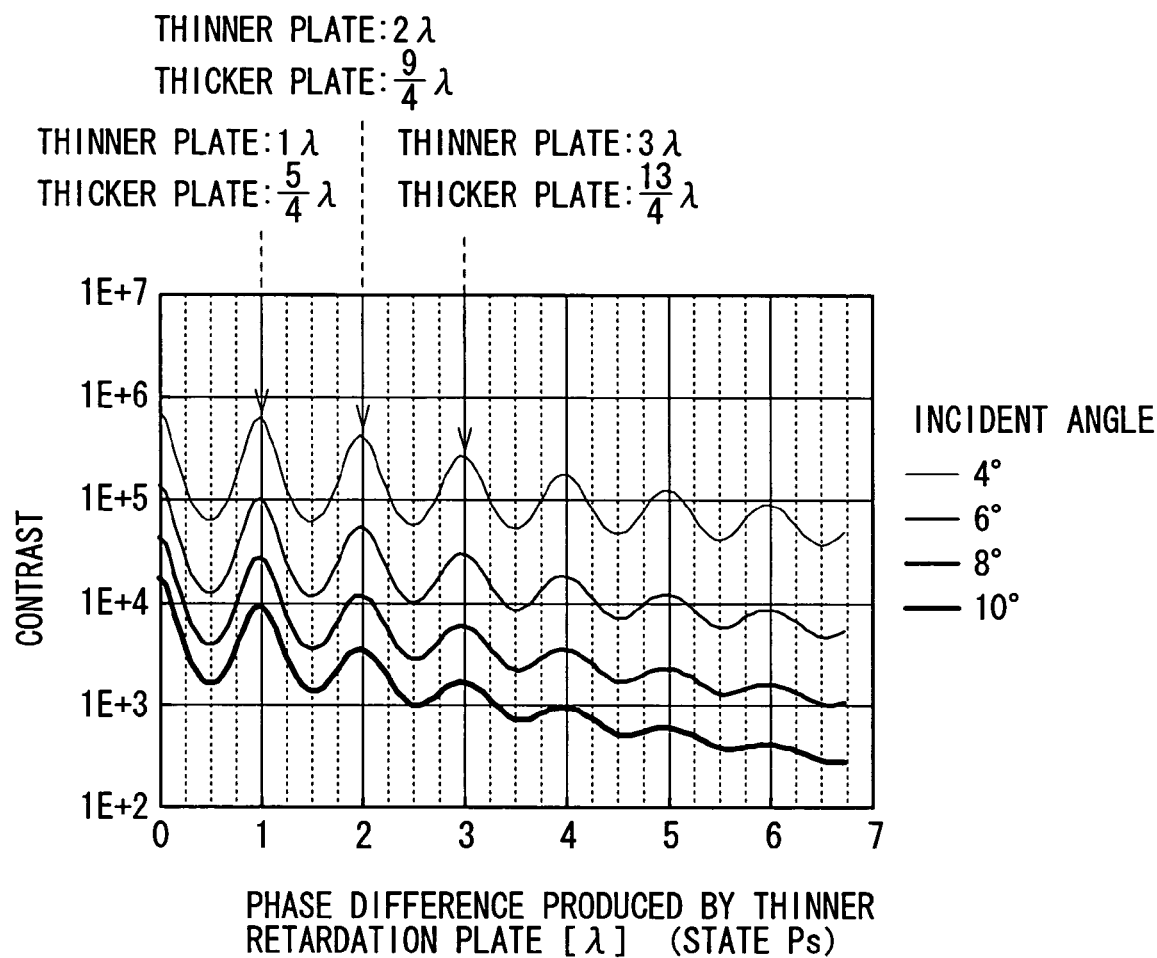
FIG. 14 is a graph showing results of a simulation in the third position state wherein the horizontal axis represents an amount of phase difference produced by a thinner retardation plate.
Figure 15:
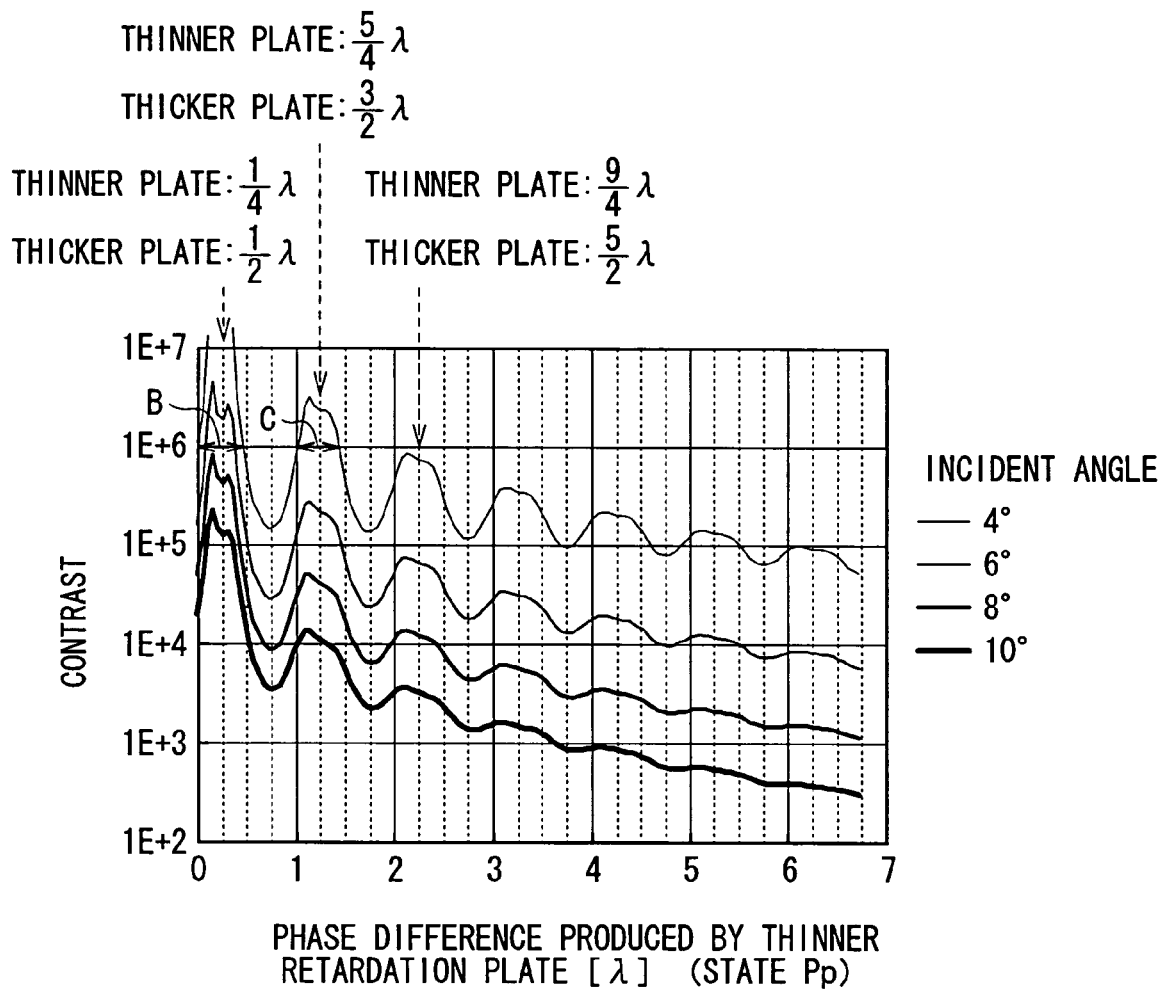
FIG. 15 is a graph showing results of a simulation in the fourth position state wherein the horizontal axis represents an amount of phase difference produced by a thinner retardation plate.
Figure 18:
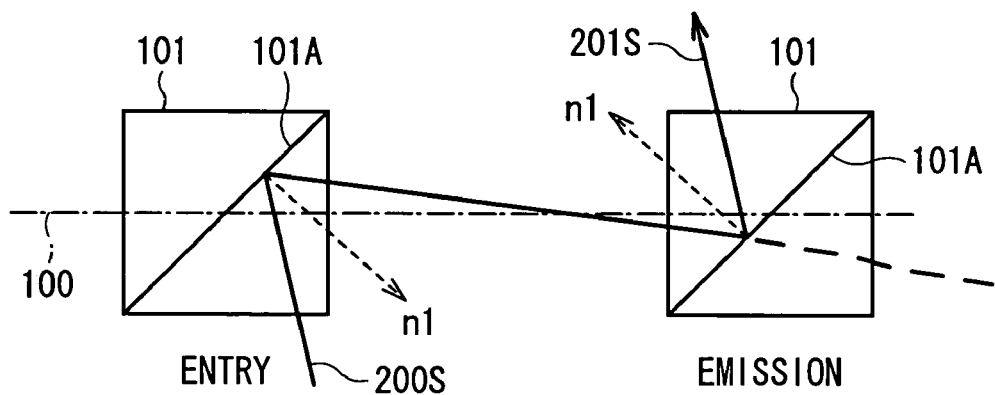
FIG. 18 is an illustration showing an ideal positional relationship of a polarization selecting surface at the time of the entry of light and at the time of the emission of light.
Figure 19:
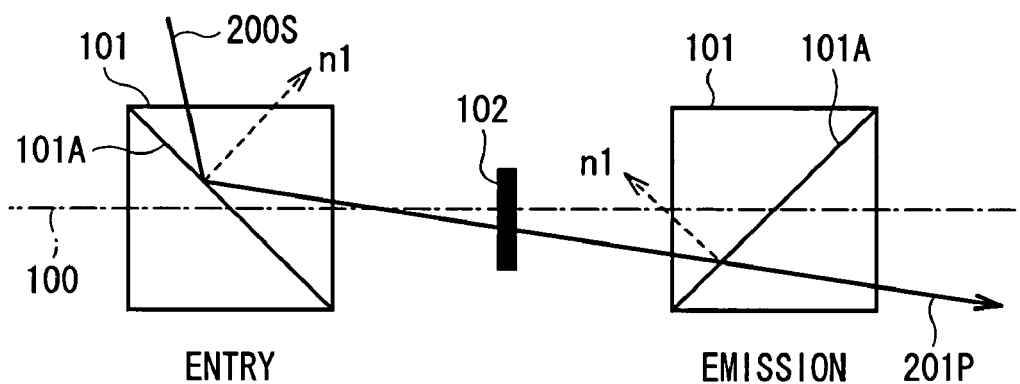
FIG. 19 is an illustration showing a practical positional relationship of the polarization selecting surface at the time of the entry of light and at the time of the emission of light.
Figure 20:
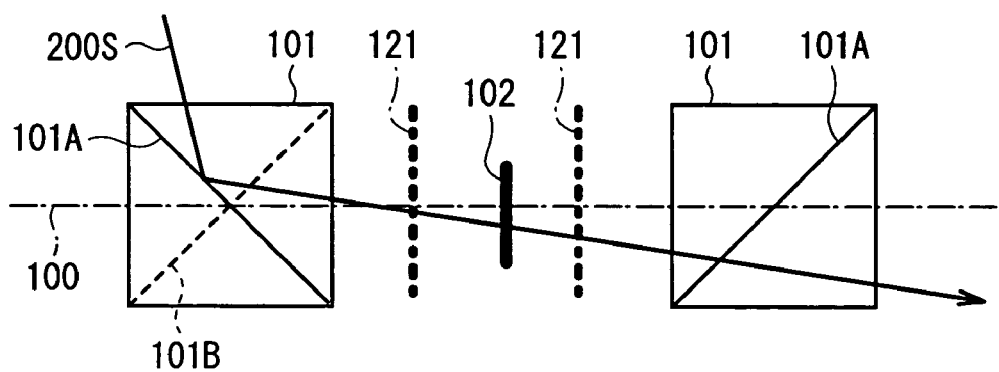
FIG. 20 is an illustration showing a positional relationship of the polarization selecting surface in the case where a quarter-wave plate is used.

The case where the positional condition of the quarter-wave plate 22 is in the first position state Ss (refer to FIG. 3) is described above. Next, FIGS. 13 through 15 show results of simulations in other three position states. In FIGS. 13 through 15, the horizontal axis represents an amount of phase difference as in the case of the graph of FIG. 12, regardless of whether the retardation plate is made of crystal such as quartz crystal or an organic film.

FIG. 13 shows results of calculation in the case of the second position state Sp (refer to FIG. 4). In this case, the horizontal axis represents the amount of phase difference produced by the first retardation plate 41 on a side closer to the PBS 20. In the state Sp, the first peak is shown when the thinner retardation plate producing a phase difference of ½ wavelength and the thicker retardation plate producing a phase difference of ¾ wavelength are combined. Performance equal to or higher than that in the case where the quarter-wave plate 22 includes a single plate can be obtained until the fifth peak.

FIG. 14 shows results of calculation in the case of the third position state Ps (refer to FIG. 5). In this case, the horizontal axis represents the amount of phase difference produced by the first retardation plate 41 on a side closer to the PBS 20. In the state Ps, the first peak is shown when the thinner retardation plate producing a phase difference of 1 wavelength and the thicker retardation plate producing a phase difference of ⁵⁄₄ wavelength are combined. Performance substantially equal to that in the case where the quarter-wave plate 22 includes a single plate can be obtained until the third peak.

FIG. 15 shows results of calculation in the case of the fourth position state Pp (refer to FIG. 6). In this case, the horizontal axis represents the amount of phase difference produced by the second retardation plate 42 on a side closer to the spatial light modulator 21. In the state Pp, the first peak is shown when the thinner retardation plate producing a phase difference of ¼ wavelength and the thicker retardation plate producing a phase difference of ½ wavelength are combined. Performance equal to or higher than that in the case where the quarter-wave plate 22 includes a single plate can be obtained until the fifth peak. Specifically, at the first peak, extremely high performance can be obtained.

When each state is comprehensively considered from the results obtained in FIGS. 12 through 15, in all of the states except for the state Ps, the first peak in the case where the two retardation plates 41 and 42 are combined is sufficiently high, compared to the case where the quarter-wave plate 22 includes a single plate (the amount of phase difference produced by the thinner retardation plate is 0), so a tolerance when actually forming the retardation plates 41 and 42 can be increased. The second and later peaks are lower than the first peak, thereby the tolerance is reduced; however, until the fifth peak, a better result than that in the case where the quarter-wave plate 22 includes a single plate can be obtained in general, so it can be expected that effects will be improved more than ever.

FIG. 16 shows characteristics of each position state and a preferred amount of phase difference in each position state. The amount of phase difference represents an amount produced by a retardation plate producing a smaller absolute value of the amount of phase difference; however, the total phase difference is ¼ wavelength, so a phase difference produced by a retardation plate producing a larger absolute value is uniquely determined.

As shown in FIG. 16, in the state Ss, the amount of phase difference produced by the second retardation plate 42 is preferably within a range of (0.75±0.3) wavelength, or within a range of (N−0.25±0.2) wavelength assuming that N is an integer ranging from 2 to 5 inclusive.

In the state Sp, the amount of phase difference produced by the first retardation plate 41 is preferably within a range of (0.5±0.4) wavelength, or within a range of (N−0.5±0.3) wavelength assuming that N is an integer ranging from 2 to 5 inclusive.

In the state Ps, the amount of phase difference produced by the first retardation plate 41 is preferably within a range of (N±0.2) wavelength assuming that N is an integer ranging from 1 to 3 inclusive.

In the state Pp, the amount of phase difference produced by the second retardation plate 42 is preferably within a range of larger than 0 and 0.65 wavelength or less, or within a range of (N−0.75±0.4) wavelength assuming that N is an integer ranging from 2 to 5 inclusive.

As a result, it can be said that the state Pp among the position states is the best; however, when the four states are comprehensively considered, performance higher than that in the case where the quarter-wave plate 22 includes a single plate in the state Pp can be obtained by selecting some position state when the amount of phase difference produced by a thinner retardation plate is within a range of higher than 0 and ¾ wavelength or less and within a range of 1 wavelength to ½ wavelength. In other words, specifically high performance can be obtained within ranges A, B and C of phase difference shown in FIGS. 13 and 15. Therefore, when they are comprehensively considered, a preferable range is higher than 0 and ¾ wavelength or less (the ranges A and B), and from 1 wavelength to ½ wavelength (the rage C). The quarter-wave plate within the ranges delivers best performance in the case where there is no restriction in placement.

As described above, according to the embodiment, the quarter-wave plate 22 placed between the PBS 20 and the spatial light modulator 21 to correct a polarization state includes two retardation plates 41 and 42, and the retardation plates 41 and 42 are combined so that suitable phase differences are set according to the position state, so in spite of the fact that the quarter-wave plate 22 includes two retardation plates 41 and 42, the polarization state can be corrected properly with performance equal to or higher than that in the case where the quarter-wave plate 22 includes a single plate, thereby image quality in the projector can be improved. In this case, without making a change to the conventional optical system, specifically an improvement in the contract can be achieved. The effect of the improvement in performance is effective in the case where light has an incident angle. Therefore, for example, when an angle of a luminous flux entering the spatial light modulator 21 is widened, although a change in the shape of each optical device (mainly the size) is required, even if a conventional light source as the light source 11 and a conventional spatial light modulator as the spatial light modulator 21 are used, the intensity can be improved.

The invention is not limited to the above embodiment, and can be variously modified. For example, in the above embodiment, as an example of the structure of the projector, the case where three spatial light modulators 21R, 21G and 21B are used corresponding to the primary colors is described; however, the structure in which only one spatial light modulator is used to control the display of the primary colors by timesharing may be used. Moreover, in the above embodiment, the case where the quarter-wave plate 22 is used in the projector is taken as an example; however, the above-described technique for optimizing phase differences produced by the retardation plates 41 and 42 can be applied to any other apparatus which corrects the polarization state using the quarter-wave plate 22.

As described above, in the projector according to the invention, the quarter-wave plate placed between the reflective spatial light modulator and the polarization selecting device includes a combination of the first and the second retardation plates which each produce a different phase difference, and the phase differences produced by the two retardation plates are set to be suitable amounts of phase difference according to the position state, so in spite of the fact that the quarter-wave plate includes a combination of two retardation plate, the quarter-wave plate can correct the polarization state properly with performance equal to or higher than that in the case where the quarter-wave plate includes a single plate, thereby image quality can be improved.

Moreover, in the method of placing the retardation plate according to the invention, the quarter-wave plate placed between the reflective spatial light modulator and the polarization selecting device includes a combination of the first and the second retardation plates which each produce a different amount of phase difference, and the phase differences produced by the two retardation plate are set to be suitable amounts of phase difference according to the position state, so in spite of the fact that the quarter-wave plate includes a combination of two retardation plate, in the case where the quarter-wave plate is used in a projector or the like, the quarter-wave plate can correct the polarization state properly with performance equal to or higher than that in the case where the quarter-wave plate includes a single plate, thereby image quality can be improved.

Further, the retardation plate according to the invention includes the first and the second retardation plates which each produce a different amount of phase difference, and the first and the second retardation plates are combined so that slow axes of the retardation plates are substantially orthogonal to each other, thereby a combination of the retardation plates produces an amount of phase difference of approximately ¼ wavelength in total, and an amount of phase difference produced by a retardation plate producing a smaller absolute value of the amount of phase difference between the first and the second retardation plates is within a range of larger than 0 and ¾ wavelength or less, or within a range of 1 wavelength to ½ wavelength inclusive, so in spite of the fact that the retardation plate includes a combination of two retardation plates, in the case where the retardation plate is used in a projector or the like, the retardation plate can correct the polarization state properly with performance equal to or higher than that in the case where the retardation plate includes a single plate.

The invention claimed is:

1. A projector, comprising:
   a reflective spatial light modulator performing modulation by control of a polarization state;
   a polarization selecting device having a polarization selecting surface inclined with respect to the spatial light modulator, selecting light of a predetermined polarized component in incident light in the polarization selecting surface to enter the selected light into the spatial light modulator, and emitting light of a polarized component different from the predetermined polarized component in light modulated and reflected by the spatial light modulator in a direction different from a direction where the incident light enters;
   a quarter-wave plate being placed between the spatial light modulator and the polarization selecting device; and
   a projecting means projecting light reflected by the spatial light modulator and selected by the polarization selecting device to form an image,
   wherein the quarter-wave plate includes a first retardation plate and a second retardation plate each producing a different amount of phase difference, and the first and the second retardation plates are placed and combined in order from a side closer to the polarization selecting device so that their slow axes are orthogonal to each other, thereby a combination of the first and the second retardation plates produces a phase difference of approximately ¼ wavelength, assuming that a direction of the line of intersection of a surface including a normal of the polarization selecting surface and a normal of the quarter-wave plate and a plate surface of the quarter-wave plate is a reference direction, the first retardation plate placed on a side closer to the polarization selecting device is placed so that the slow axis thereof is substantially orthogonal to the reference direction, and a slow axis of the quarter-wave plate is placed so as to be substantially orthogonal to the reference direction, an amount of phase difference produced by a retardation plate producing a smaller absolute value of the amount of phase difference is within a range of (0.75±0.3) wavelength, or within a range of (N−0.25±0.2) wavelength where N is an integer ranging from 2 to 5 inclusive, and said retardation plate producing a smaller absolute value of phase difference than that of a total phase difference, between the first and second retardation plates.

2. A method of placing a retardation plate, comprising the step of:

placing a quarter-wave plate producing a phase difference of approximately ¼ wavelength between a spatial light modulator and a polarization selecting device, the spatial light modulator performing modulation by control of a polarization State, and the polarization selecting device having a polarization selecting surface inclined with respect to the spatial light modulator, selecting light of a predetermined polarized component in incident light in the polarization selecting surface to enter the selected light into the spatial light modulator, and emitting light of a polarized component different from the predetermined polarized component in light modulated and reflected by the spatial light modulator in a direction different from a direction where the incident light enters, wherein the quarter-wave plate includes a first retardation plate and a second retardation plate each producing a different amount of phase difference, and the first and the second retardation plates are placed and combined in order from a side closer to the polarization selecting device so that their slow axes are orthogonal to each other, thereby a combination of the first and the second retardation plates produces a phase difference of approximately ¼ wavelength, assuming that a direction of the line of intersection of a surface including a normal of the polarization selecting surface and a normal of the quarter-wave plate and a plate surface of the quarter-wave plate is a reference direction, the first retardation plate placed on a side closer to the polarization selecting device is placed so that the slow axis thereof is substantially orthogonal to the reference direction, and a slow axis of the quarter-wave plate is placed so as to be substantially orthogonal to the reference direction, an amount of phase difference produced by the retardation plate producing a smaller absolute value of the amount of phase difference is within a range of (0.75±0.3) wavelength, or within a range of (N−0.25±0.2) wavelength where N is an integer ranging from 2 to 5 inclusive, and said retardation plate producing a smaller absolute value of phase difference than that of a total phase difference, between the first and second retardation plates.

3. A retardation plate, being placed on a incident side of a reflective spatial light modulator performing modulation of incident light by control of a polarization state, and including a first retardation plate and a second retardation plate each producing a different amount of phase difference, the first and the second retardation plates being placed and combined so that their slow axes are substantially orthogonal to each other, thereby a combination of the first and the second retardation plates produces a phase difference of approximately ¼ wavelength, wherein an amount of phase difference produced by the retardation plate producing a smaller absolute value of the amount of phase difference is within a range of larger than 0 and ¾ wavelength or less, or within a range of 1 wavelength to (3/2) wavelength inclusive, and said retardation plate producing a smaller absolute value of phase difference than that of a total phase difference, between the first and second retardation plates.

* * * * *